United States Patent
Giorgetti

(10) Patent No.: US 12,472,159 B2
(45) Date of Patent: Nov. 18, 2025

(54) COMPOSITIONS COMPRISING AMINO ACIDS FOR USE IN THE PREVENTION AND TREATMENT OF CHEMOTHERAPY SIDE EFFECTS

(71) Applicant: Professional Dietetics S.p.A., Milan (IT)

(72) Inventor: Paolo Luca Maria Giorgetti, Milan (IT)

(73) Assignee: Professional Dietetics S.p.A., Milan (IT)

( * ) Notice: Subject to any disclaimer, the term of this patent is extended or adjusted under 35 U.S.C. 154(b) by 707 days.

(21) Appl. No.: 17/792,380

(22) PCT Filed: Dec. 21, 2020

(86) PCT No.: PCT/IB2020/062291
§ 371 (c)(1),
(2) Date: Jul. 12, 2022

(87) PCT Pub. No.: WO2021/144639
PCT Pub. Date: Jul. 22, 2021

(65) Prior Publication Data
US 2023/0067642 A1    Mar. 2, 2023

(30) Foreign Application Priority Data
Jan. 13, 2020 (IT) .............. 102020000000442

(51) Int. Cl.
*A61K 31/194* (2006.01)
*A61K 31/198* (2006.01)
(Continued)

(52) U.S. Cl.
CPC .......... *A61K 31/194* (2013.01); *A61K 31/198* (2013.01); *A61K 31/405* (2013.01);
(Continued)

(58) Field of Classification Search
CPC .............. A61K 2300/00; A61K 31/194; A61K 31/198; A61K 31/405; A61K 31/4172;
(Continued)

(56) References Cited

U.S. PATENT DOCUMENTS 6,537,969 B1    3/2003    Blass
7,982,066 B2    7/2011    Scheele
(Continued)

FOREIGN PATENT DOCUMENTS

CA    2972889 A1    9/2016
CN    105982914 A   10/2016
(Continued)

OTHER PUBLICATIONS

Green et al. (Biochmica et Biophysica Acta 1588 (2002) 94-101 (Year: 2002).*

(Continued)

*Primary Examiner* — Savitha M Rao
(74) *Attorney, Agent, or Firm* — Nixon & Vanderhye, PC

(57) ABSTRACT

Composition for use in the prevention and/or in the treatment of cardiotoxicity induced by at least one chemotherapeutic agent in a subject undergoing chemotherapy, the composition comprising an active agent, said active agent containing the amino acids leucine, isoleucine, valine, threonine, lysine and citric acid, succinic acid, malic acid. Said chemotherapeutic agent may be selected in the group consisting of anthracyclines, HER2/ErbB2 inhibitors, tyrosine-kinase inhibitors, vascular endothelial growth factor inhibitors, immune checkpoint inhibitors.

18 Claims, 8 Drawing Sheets
Specification includes a Sequence Listing.

(51) Int. Cl.
A61K 31/405 (2006.01)
A61K 31/4172 (2006.01)
A61K 31/704 (2006.01)
A61P 9/00 (2006.01)
(52) U.S. Cl.
CPC ........ *A61K 31/4172* (2013.01); *A61K 31/704* (2013.01); *A61P 9/00* (2018.01)
(58) Field of Classification Search
CPC ........ A61K 31/704; A61P 39/00; A61P 43/00; A61P 9/00
See application file for complete search history.

(56) References Cited

U.S. PATENT DOCUMENTS

| | | |
|---|---|---|
| 9,597,367 B2 | 3/2017 | Wolfe et al. |
| 10,226,441 B2 | 3/2019 | Higashi et al. |
| 11,337,946 B2 | 5/2022 | Giorgetti |
| 11,452,702 B2 | 9/2022 | Giorgetti |
| 11,957,651 B2 | 4/2024 | Giorgetti |
| 12,239,622 B2 | 3/2025 | Giorgetti |
| 2003/0013761 A1 | 1/2003 | Joshi |
| 2003/0055099 A1 | 3/2003 | Martynyuk et al. |
| 2013/0084378 A1 | 4/2013 | Jun et al. |
| 2013/0237605 A1 | 9/2013 | Zemel |
| 2014/0243400 A1 | 8/2014 | Mcgill |
| 2014/0315788 A1 | 10/2014 | Wolfe |
| 2015/0335627 A1 | 11/2015 | Yue et al. |
| 2016/0038565 A1 | 2/2016 | Khan |
| 2018/0000764 A1 | 1/2018 | Hernández Miramontes |
| 2020/0230093 A1 | 7/2020 | Giorgetti |
| 2020/0253906 A1 | 8/2020 | Giorgetti |
| 2021/0260011 A1 | 8/2021 | Giorgetti |
| 2022/0110899 A1 | 4/2022 | Giorgetti |
| 2022/0249418 A1 | 8/2022 | Giorgetti |
| 2023/0079527 A1 | 3/2023 | Giorgetti |

FOREIGN PATENT DOCUMENTS

| | | |
|---|---|---|
| EP | 2196203 A1 | 6/2010 |
| EP | 2676664 A1 | 12/2013 |
| EP | 2881112 A1 | 6/2015 |
| GB | 2029220 A | 3/1980 |
| JP | H0873351 A | 3/1996 |
| JP | 2007161642 A | 6/2007 |
| JP | 6023813 B2 | 10/2016 |
| WO | 2001051047 A1 | 7/2001 |
| WO | 2003013487 A2 | 2/2003 |
| WO | 2005034932 A2 | 4/2005 |
| WO | 2006046746 A1 | 5/2006 |
| WO | 2007049818 A1 | 5/2007 |
| WO | 2012040707 A2 | 3/2012 |
| WO | 2012/147901 | 11/2012 |
| WO | 2016093104 A1 | 6/2016 |
| WO | 2016116580 A1 | 7/2016 |
| WO | 2016179657 A1 | 11/2016 |
| WO | 2016181335 A1 | 11/2016 |
| WO | 2017020121 A1 | 2/2017 |
| WO | 2017089612 A1 | 6/2017 |
| WO | 2018201024 A1 | 11/2018 |
| WO | 2019/021135 | 1/2019 |
| WO | 2019021137 A1 | 1/2019 |
| WO | 2019070750 A1 | 4/2019 |
| WO | 2019165321 A1 | 8/2019 |
| WO | 2020003013 A1 | 1/2020 |
| WO | 12022023932 A1 | 2/2022 |
| WO | 2022266480 A1 | 12/2022 |

OTHER PUBLICATIONS

Balaraman Kalyanaraman, "Teaching the basics of the mechanism of doxorubicin-induced cardiotoxicity: Have we been barking up the wrong tree?" Redox Biology, 29: 101394 (2020).

Choudhury et.al., Mitochondrial determinants of cancer health disparities, Seminars in Cancer Biology, 2017, 47:125-146.
International Search Report dated Mar. 16, 2021, for PCT/IB2020/062291, 5 pp.
Written Opinion of the International Searching Authority dated Mar. 16, 2021, for PCT/IB2020/062291, 8 pp.
Roberto Marques Damiani et al., "Pathways of cardiac toxicity: comparison between chemotherapeutic drugs doxorubicin and mitoxantrone", Archives of Toxicology, vol. 90, No. 9, Jun. 25, 2016, pp. 2063-2076.
Chowdhury S. Abdullah et al., "Doxorubicin-induced cardiomyopathy associated with inhibition of autophagic degradation process and defects in mitochondrial respiration", Scientific Reports, vol. 9, No. 1, Feb. 14, 2019, 20 pp.
Anouk E. Hiensch et al., "Doxorubicin-induced skeletal muscle atrophy: Elucidating the underlying molecular pathways", Acta Physiologica, vol. 229, No. 2, Oct. 10, 2019, 18 pp.
Laura A.A. Gilliam et al., "The anticancer agent doxorubicin disrupts mitochondrial energy metabolism and redox balance in skeletal muscle", Free Radical Biology and Medicine, vol. 65, Sep. 7, 2013, pp. 988-996.
Bianchi et al. "Not all cancers are created equal: Tissue specificity in cancer genes and pathways", Current Opinion in Cell Biology. 2020; 63:135-143, Year: 2020.
Boshuizen et al. "Rational Cancer Treatment Combinations: An Urgent Clinical Need", Molecular Cell, 2020, 78:1002-1018, Year: 2020.
Demarco, C. "Adenocarcinomas: 6 things to know about the 'cancer of the cavities'", MD Anderson Cancer Center, 2021, https://www.mdanderson.org/cancerwise/adenocarcinomas-6-things-to-know-about-the-cancer-of-the-cavities.hOO-159465579. html#:~:text=That%20being%20said%2C%20chemotherapy%20is,fantastic%20advance%20in%20early%20detection. (Year: 2021).
Fakouri et al. "From Powerhouse to Perpetrator-Mitochondria in Health and Disease", Biology. 2019;8(2): 3, Year: 2019.
Hörig et al. "From bench to clinic and back: Perspective on the IQPC Translational Research conference", Journal of Translational Medicine 2004, 2(44), Year: 2004.
MedlinePlus. Types of Chemotherapy. https://medlineplus.gov/ency/patientinstructions/000910.htm#:~:text=There%20are%20more%20than%20100,from%20typical%20chemotherapy%20side%20effects) (Year: 2023).
Schafer et al. "Failure is an option: learning from unsuccessful proof-of-concept trials", Drug Discovery Today, 13 (21/22), 913-916, Year: 2008.
Anonymous: "Amino acid-derived therapy for Inflammatory bowel disease: L-Leucine, the branched chain amino acid, promotes NFKB-p50/p65 dimer formation, induces inflammatory gene expression downstream of RelA/p65, inhibits colonic pathogenesis, and stalls the progression of inflammatory bowel disease and colitis", May 16, 2017, XP093023862, 5 pages, retrieved from the Internet: URL: https://genomediscovery.org/natural-product-derived-therapy-for-inflammatory-bowel-disease-1-leucine-the-branched-chain-amino-acid-promotes-nfkb-p50p65-dimer-formation-induces-inflammatory-gene-expression-downstream-of-rel/.
Ashida, Toshifumi et al., "Effect of Oral Administration of Isoleucine, Stimulant of Innate Immunity, in IBD Patients", Gastroenterology, vol. 26, No. 4, Suppl 2, Apr. 1, 2004, 1 page, XP093023803, URL:https : //www.gastrojournal.org/issue/S0016-5085(00)X0347-2. retrieved from the Internet.
Beale et al., A Randomized Clinical Trial of High-Dosage Coenzyme Q10 in Early Parkinson Disease No Evidence of Benefit, JAMA Neurol., 71(5), pp. 543-552, 2014.
Bonfili et al. The FEBS Journal. 2017; 284: 1726-1737 (Year: 2017).
Bournat, J.C., et al., Mitochondrial Dysfunction in Obesity Current Opinion Endocrinol Obesity, October, 17(5): 446-452, 2010.
Brocca et al., "Proteomic analysis of plasma after branched chain enriched mixture supplementation in mice", Journal of the International Society of Sports Nutrition, vol. 10, No. 1, Apr. 3, 2013, 5 pages.
Brown et al., Mitochondrial function as a therapeutic target in heart failure, Nat Rev Cardiol., 14(4), pp. 238-250, 2017.

(56) References Cited

OTHER PUBLICATIONS

Daher et al., J Clin Transl Hepatol. Mar. 28, 2018;6(1):69-78 (Year: 2018).
Unknown, Database WPI Week 200744, May 3, 2007, Thomson Scientific, London, GB, XP002788927, 3 pages.
Chiechio, et al., "L-Acetylcarnitine: A Proposed Therapeutic Agent for Painful Peripheral Neuropathies", Current Neuropharmacology, vol. 4, No. 3, Jul. 1, 2006, pp. 233-237 (5 pages).
Fernández-Vizarra, et al., Tissue-specific differences in mitochondrial activity and biogenesis, Mitochondrion, vol. 11, pp. 207-213, 2011.
Gorshinova et al., "Mitochondrial dysfunction as one of the mechanisms of impaired reproductive function in obesity." Akusherstvo i ginekologiya/Obstetrics and Gynecology. 2014; 7: 9-13. in Russian with English Abstract.
Hall et al., "Lipid Peroxidation in Brain or Spinal Cord Mitochondria After Injury" J Bioenerg. Biomembr. Apr. 2016; 48(2): 169-174 (2017).
Keenan et al,, Effects of carboxylic acids on the uptake of non-transferrin-bound iron by astrocytes, Neurochemistry International, 56: 843-849, 2010.
Kim, Yun-Gi et al., "Neonatal acquisition of Clostridia species protects against colonization by bacterial pathogens", Science, vol. 356, No. 6335, Apr. 21, 2017, pp. 14 pages.
Liu, Yulan et al., "Roles of amino acids in preventing and treating intestinal diseases: recent studies with pig models", Amino Acids, vol. 49, No. 8, Jun. 14, 2017, pp. 1277-1291.
Ma et al., Inhibition of AMP-Activated Protein Kinase Signaling Alleviates Impairments in Hippocampal Synaptic Plasticity Induced by Amyloid, The Journal of Neuroscience, 34(36), 12230-12238, Sep. 3, 2014.
Mao, Xiangbing et al, "l-Isoleucine Administration Alleviates DSS-Induced Colitis by Regulating TLR4/MyD88/NF-kB Pathway in Rats", Frontiers in Immunology, vol. 12, Article 817583, Jan. 11, 2022, 12 pages.
Unknown, MP Biomedical—Technical Information—AIN-93-Diet,pp. 1-3 (Year: 2023).
Nakagaichi, M., et al., "Effects of Exercise Training Plus Vespa Amino Acid Mixture (VAAM) Ingestion in Obese Women," Japanese Journal of Health Promotion, Mar. 11-16, 2001 with English Abstract.
Nakamura, E., et al., "Assessment of Biological Age by Principal Component Analysis," Mechanisms of Ageing and Development, vol. 46. Issues1-3, pp. 1-18, 1988, with English Translation of Office Action for JP Application No. 2019-566744 citing Nakamura attached to satisfy the requirement for a concise explanation of relevance.
Nergiz et al.; "Organic acid content and composition of the olive fruits during ripening and its relationship with oil and sugar"; 2009; Scientia Horticulturae; 122: 216-220 (Year: 2009).
Pantuck et al. Anesth Analg. 1989; 69: 727-731 (Year: 1989).
Rao et al., Mitochondrial permeability transition pore is a potential drug target for neurodegeneration, Biochimica et Biophysica Acta, 1267-1272, 2014.
Sbodio et al., Redox Mechanisms in Neurodegeneration: From Disease Outcomes to Therapeutic Opportunities, Antioxidants & Redox Signaling, vol. 30, No. 11, pp. 1450-1499, 2019.
Scholpa & Schnellmann, "Mitochondrial-Based Therapeutics for the Treatment of Spinal Cord Injury: Mitochondrial Biogenesis as a Potential Pharmacological Target." J Pharmacol Exp Ther 363:303-313, Dec. 2017.
Short et al., Decline in skeletal muscle mitochondrial function with aging in humans, PNAS, vol. 102, No. 15, pp. 5618-5623, Apr. 12, 2005.
Sprong et al., "Dietary cheese whey protein protects rats against mild dextran sulfate sodium-induced colitis: Role of mucin and microbiota", Journal of Dairy Science, vol. 93, No. 4, Apr. 1, 2010, pp. 1364-1371.
Sullivan et al., "Mitochondrial Permeability Transition in CNS Trauma: Cause or Effect of Neuronal Cell Death?" Journal of Neuroscience Research, 2005, 79:231-239.
Sun et al., The Mitochondrial Basis of Aging, Mol Cell., 61(5), pp. 654-666, Mar. 3, 2016.
Tapper et al., JAMA. 2023;329(18):1589-1602 (Year: 2023).
Tedesco et al., A specific amino acid formula prevents alcoholic liver disease in rodents, Am J Physiol Gastrointest Liver Physiol., Epub Jan. 25, 2018, 314(5):G566-G582.
Vingtdeux et al., AMPK is abnormally activated in tangle- and pre-tangle-bearing neurons in Alzheimer's disease and other tauopathies, Acta Neuropathol, vol. 121, pp. 337-349, 2010.
Wang et al., "Mitochondrial dysfunction in neurodegenerative diseases and the potential countermeasure," CNS Neurosci Ther. 25: 816-824 (2019).
Wang, X. et al., "Increases in mitochondrial biogenesis impair carcinogenesis at multiple levels" Molecular Oncology, Elsevier. Jul. 27, 2011., vol. 5, No. 5, pp. 399-409 (11 pages).
Westermann et al., Mitochondrial fusion and fission in cell life and death, Molecular Cell Biology, vol. 11, 13 pages, Dec. 2010.
Youle et al., Mitochondrial Fission, Fusion, and Stress, Science, 337(6098), pp. 1062-1065, Aug. 31, 2012.

* cited by examiner

COMPOSITIONS COMPRISING AMINO ACIDS FOR USE IN THE PREVENTION AND TREATMENT OF CHEMOTHERAPY SIDE EFFECTS

This application is the U.S. national phase of International Application No. PCT/IB2020/062291 filed Dec. 21, 2020, which designated the U.S. and claims priority to IT 102020000000442 filed Jan. 13, 2020, the entire contents of each of which are hereby incorporated by reference.

REFERENCE TO A SEQUENCE LISTING SUBMITTED ELECTRONICALLY VIA EFS-WEB

The content of the electronically submitted sequence listing (Name: 4636-532_Sequence_Listing.txt, Size: 6,177 bytes; and Date of Creation: Jul. 12, 2022) is herein incorporated by reference in its entirety.

FIELD OF THE INVENTION

The present description relates generally to compositions comprising amino acids for use in the prevention and treatment of chemotherapy side effects.

BACKGROUND

Breast cancer is the most prevalent neoplastic disease among women worldwide. Approximately 1.67 million new cases of this tumor were diagnosed in 2012. In 2018, new cases of breast cancer were diagnosed in nearly 2.1 million (11.6%) women, and about 627,000 (6.6%) of women died from this type of cancer. This prognosis suggests that several types of breast cancer are still incurable diseases leading to a high female mortality rate.

Anthracyclines, such as doxorubicin (DOX), are widely used and highly successful anticancer chemotherapeutics. Unfortunately, DOX administration results in dose-dependent side effects to non-cancer tissues, including the development of cardiomyopathy, in addition to dyspnea, exercise intolerance, hepatotoxicity, and nephropathy. Beyond the anthracyclines, newer therapies including those targeting human epidermal growth factor (HER) 2 (HER2/ErbB2 inhibitors), several tyrosine-kinase inhibitors, vascular endothelial growth factor inhibitors, and immune checkpoint inhibitors—have demonstrated profound cardiovascular toxicities. For patients with HER2-positive breast cancer, treatment with trastuzumab has also been related with cardiomyopathy, as characterized by the loss of left ventricular ejection fraction after treatment. Cancer patients that develop cancer therapy—related cardiomyopathy have significantly worse survival as compared with those without cardiotoxicity. These toxicities represent a limiting factor in the therapy of several otherwise-treatable neoplasms, and an aging population with impaired cardiac reserve may be even more susceptible to these effects. Thus, the risk of cardiotoxicity is one of the greatest limiting factors to the clinical use of these drugs, resulting in both acute and chronic cardiovascular events. As an example, acute cardiac toxicity of DOX can develop within minutes to days after administration and normally is characterized by hypotension, arrhythmia, and most importantly left ventricular failure. Although the molecular mechanisms of these side effects are not fully understood, also because DOX affects many different intracellular processes, increasing evidence suggests that the primary mediator of cardiac damage by DOX is oxidative stress, with increased reactive oxygen species (ROS)-dependent lipid peroxidation and reduced levels of antioxidants and sulfhydryl groups. The increased oxidative stress is followed by the development of cardiomyopathy and heart failure. Mitochondrial dysfunction may be involved in the side effects induced by DOX and in general by other chemotherapeutic agents, because the high production of ROS causes mitochondrial impairment, with reduced ATP synthesis, and apoptosis of cardiac cells.

Nevertheless, cardiomyopathy and hearth failure induced by chemotherapeutic agents is different from both the anatomical-pathological and pathophysiological point of view compared to hearth failure induced by cardiovascular causes. This is the reason why typically, chemotherapy-induced cardiomyopathy and hearth failure are refractory to conventional therapy.

Moreover, additional critical issues associated with the identification of effective treatments of the cardiotoxicity induced by chemotherapy lies from the evidence that potentially suitable approaches for the treatment of cardiomyopathy or heart failure may not be suitable for the specific group of patients, i.e. patients affected by cancer. Cancer cells have metabolic profiles different from those of cells of healthy subjects and contrasting evidence are emerging on the role of mitochondrial activity in the proliferation of cancer cells. Therapeutic approaches capable of restoring the mitochondrial functionality may lead to an increase in the proliferation of cancer cells and thus to a reduction in the antineoplastic effect exerted by chemotherapeutic agents.

SUMMARY OF THE INVENTION

The present description has the aim of providing new amino acid-based compositions particularly effective in counteracting the cardiotoxicity induced by chemotherapeutic agents in a subject affected by cancer and undergoing chemotherapy.

According to the present description, the above object is achieved thanks to the subject matter specifically recalled in the ensuing claims, which are understood as forming an integral part of this disclosure.

An embodiment of the present description provides a composition for preventing and/or treating cardiotoxicity induced by at least one chemotherapeutic agent in a subject undergoing chemotherapy, the composition comprising an active agent, said active agent containing the amino acids leucine, isoleucine, valine, threonine, lysine and citric acid, succinic acid, malic acid.

The at least one chemotherapeutic agent may selected in the group consisting of anthracyclines, HER2/ErbB2 inhibitors, tyrosine-kinase inhibitors, vascular endothelial growth factor inhibitors, immune checkpoint inhibitors. The anthracyclines are preferably selected in the group consisting of doxorubicin, epirubicin, daunorubicin, idarubicin, pixantrone, sabarubicin, valrubicin, derivatives thereof.

In one or more embodiments, the active agent of the composition further contains one or more amino acids selected in the group consisting of histidine, phenylalanine, methionine, tryptophan, cysteine and tyrosine.

BRIEF DESCRIPTION OF THE DRAWINGS

The invention will now be described, by way of example only, with reference to the enclosed figures, wherein.

*p<0.05, p<0.01, and *p<0.001 vs. untreated cells; †p<0.05 vs. DOX-treated cells. All data are presented as the mean±SD.

Figure 12:
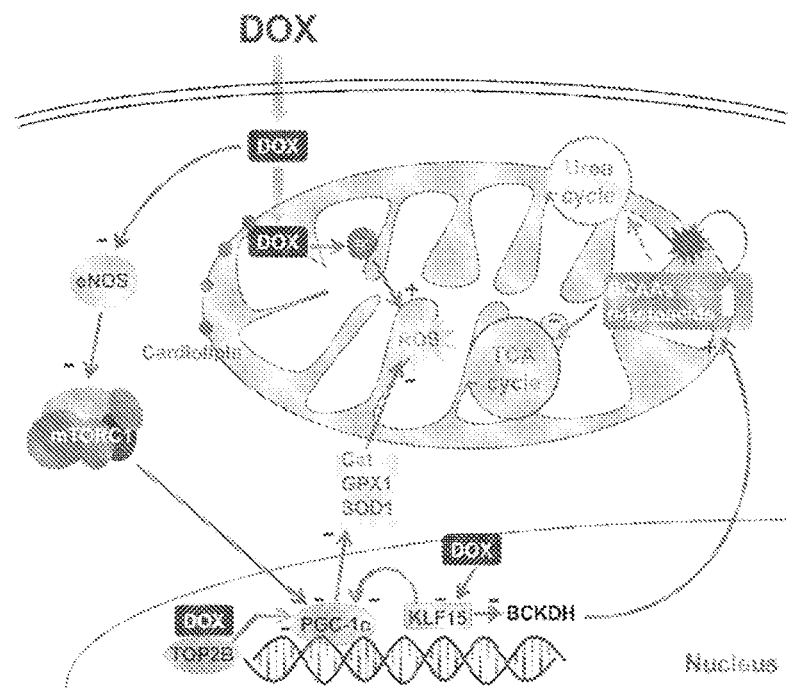

FIG. 12 shows a proposed model of α5 protective actions on mitochondrial damage induced by doxorubicin (DOX) in cardiomyocytes. Plus (+) and minus (−) symbol indicate stimulation or inhibition induced by DOX and, potentially, the α5 target sites. DOX reduces mitochondrial biogenesis and function 1) binding to topoisomerase IIβ (TOP2B), which complexes to the promoters of Ppargc1a and Ppargc1b and blocks transcription of mitochondrial genes, including ROS defense genes, 2) reducing eNOS expression and mTORC1 activity, which are important regulators of mitochondrial physiology, 3) limiting KLF15 gene expression and presumably BCAA oxidation, with a-ketoacid and BCAA accumulation, which are toxic at high levels, beyond reduced TCA cycle intermediates and mitochondrial energy production. Mitochondrial accumulation of DOX is accompanied by increased ROS.

Figure 13:
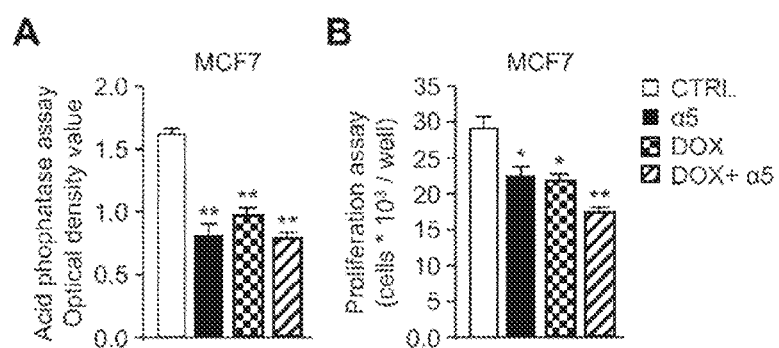

FIG. 13 is relative to MCF7 breast cancer cell proliferation. The anti-proliferative effect of DOX remained unchanged in the MCF7 cells in the presence of the amino acid mixture. (A) Acid phosphatase assay: cells (5,000-20,000/well in 96-well plates) were treated with 1% α5 for 48 h and 1 μM DOX for 16 h. (B) Proliferation assay: cells (50,000/well in 12-well plates) were treated as in (A) and Trypan blue exclusion assay was used. n=3 experiments. *p<0.05 and **p<0.01 vs. untreated cells. All data are presented as the mean±SD.

DETAILED DESCRIPTION OF PREFERRED EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

The present description has the aim of providing new amino acid-based compositions particularly effective in counteracting the cardiotoxicity induced by chemotherapeutic agents in a subject undergoing chemotherapy. The composition is capable of preventing and restoring mitochondrial dysfunction specifically induced by chemotherapeutic agents in cardiac cells. The cardiotoxicity induced by chemotherapeutic agents may comprise cardiomyopathy or heart failure.

The present description provides a composition for preventing and/or treating cardiotoxicity induced by at least one chemotherapeutic agent in a subject affected by cancer and undergoing chemotherapy, the composition comprising an active agent, said active agent containing the amino acids leucine, isoleucine, valine, threonine, lysine and citric acid, succinic acid, malic acid.

Chemotherapeutic agents, also referred to as antineoplastic agents, are used to directly or indirectly inhibit the proliferation of rapidly growing cells, exerting an antineoplastic effect. The composition herein disclosed is effective in preventing and/or treating cardiotoxicity induced by anthracyclines, HER2/ErbB2 inhibitors, tyrosine-kinase inhibitors, vascular endothelial growth factor inhibitors, immune checkpoint inhibitors. The anthracyclines may be selected in the group consisting of doxorubicin, epirubicin, daunorubicin, idarubicin, pixantrone, sabarubicin, valrubicin, derivatives thereof.

The disclosure further provides combined preparations comprising the composition herein disclosed and at least one chemotherapeutic agent for simultaneous, separate and sequential use in preventing and/or treating the cardiotoxicity induced by said at least one chemotherapeutic agent in a subject affected by cancer.

It has been shown that chronic (3 months) dietary supplementation with a branched-chain amino acid-enriched mixture (BCAAem) promoted mitochondrial biogenesis in cardiac and skeletal muscle of middle-aged mice. It has also been shown that a composition comprising the branched-chain amino acids leucine, isoleucine, valine, in combination with threonine, lysine and citric acid, succinic acid, malic acid is effective in improving mitochondrial function, as disclosed in document WO 2019/021135 A1. Nevertheless, it has also been shown that increasing efforts to prevent and to treat cardiotoxicity specifically induced by chemotherapeutic agents, encompassing administration of potentially efficacious drugs, have been proposed inconclusively [1].

The Inventor of the instant application has now surprisingly found that the composition herein disclosed can be advantageously used in the treatment of cardiotoxicity induced by chemotherapeutic agents in subjects undergoing chemotherapy. Specifically, tests carried out in vitro and in vivo show that i) cardiac cells treated with doxorubicin, as chemotherapeutic agent, are not refractory to the treatment with the composition herein disclosed in the restoration of mitochondrial functionality and ii) that the composition is capable of counteracting the cardiotoxicity induced by the chemotherapeutic agent.

Moreover, as shown in the following sections, the composition may be safely administered also to the specific group of subjects, i.e. subjects undergoing chemotherapy thus suffering from tumor pathologies. The surprising aspect of this evidence derives from the consideration that—as disclosed in the preceding section—cancer cells have metabolic profiles different from those of cells of healthy subjects and conflicting evidence are focused on the role of mitochondrial activity in the proliferation of cancer cells. For example, the mitochondrial DNA deletion of cancer cells has been shown to reduce their growth and tumorigenicity; based on these observations, a restoration of mitochondrial functionality could lead, on the contrary, to an increase in the proliferation of tumor cells and also determine a reduction in the antineoplastic effect exerted by chemotherapy agents.

The composition herein disclosed, on the contrary, is i) effective in restoring mitochondrial functionality in cardiac cells treated with doxorubicin, ii) does not favor the proliferation of tumor cells, iii) does not alter the antineoplastic effects exerted by doxorubicin, iv) very surprisingly is capable of potentiating the anti-proliferative effect of doxorubicin.

As disclosed below, the composition comprising essential amino acids, and tricarboxylic acid cycle intermediates—named α5 composition—was tested and its effect in HL-1 cardiomyocytes and mice treated with DOX was explored. As compared to a composition comprising essential branched-chain amino acids—named BCAAem composition—without tricarboxylic acid, α5 composition supplementation was significantly more effective in promoting protective effects on the DOX-induced mitochondrial dysfunction. The results were extended in vivo in young mice exposed to acute DOX treatment. The results have shown the following evidence: i) the occurrence of mitochondrial dysfunction after acute DOX administration, ii) a marked defensive validity of short-term supplementation with the α5 composition. The composition therefore may be used in the prevention and/or treatment of chemotherapeutic agent-induced cardiotoxicity, thus also preventing cardiomyopathy and/or heart failure that can arise from such induced cardiotoxicity.

The composition herein disclosed comprises an active agent, said active agent contains citric acid, succinic acid and malic acid in combination with leucine, isoleucine, valine, threonine, lysine, and the weight ratio between the total amount of citric acid, succinic acid and malic acid and the total amount of the amino acids leucine, isoleucine, valine, threonine, lysine may be comprised between 0.05 and 0.3, preferably between 0.1 and 0.25.

In one or more embodiments, the composition may consist of leucine, isoleucine, valine, threonine, lysine, citric acid, succinic acid and malic acid and optionally vitamin B1 and/or vitamin B6.

In one or more embodiments, the active agent may further comprise one or more amino acids selected in the group consisting of histidine, phenylalanine, methionine, tryptophan, cysteine, tyrosine.

In one or more embodiments, the composition may comprise an active agent consisting of leucine, isoleucine, valine, threonine, lysine, histidine, phenylalanine, methionine, tryptophan, cysteine and optionally tyrosine, as well as citric acid, succinic acid and malic acid, said amino acids being the sole amino acids contained in the composition.

In one or more embodiments, the composition may be free of any other active agents, such as any chemotherapeutic agent, i.e. any agent that directly or indirectly inhibit the proliferation of rapidly growing cells, exerting an antineoplastic effect.

In one or more embodiments, the composition may consist of leucine, isoleucine, valine, threonine, lysine, histidine, phenylalanine, methionine, tryptophan, cysteine, tyrosine, citric acid, succinic acid and malic acid and optionally vitamin B1 and/or vitamin B6.

The composition may comprise the amino acids isoleucine, leucine and valine in an amount between 35% and 65% by weight, preferably between 42% and 56% by weight with respect to the active agent weight.

The weight ratio between leucine and citric acid is comprised between 5 and 1, preferably between 2.50 and 3.50.

In one or more embodiments, the weight or molar amount of citric acid is higher than the weight or molar amount of each of malic acid and succinic acid. Preferably, the weight or molar amount of citric acid is higher than the weight or molar overall amount of malic acid plus succinic acid. In a further embodiment, the weight ratio between citric acid and the sum of malic acid and succinic acid is comprised between 1.0 and 4.0, preferably between 1.5 and 2.5. In a preferred embodiment, the citric acid:malic acid:succinic acid weight ratio is comprised between 10:1:1 and 2:1.5:1.5, preferably between 7:1:1 and 1.5:1:1, more preferably between 5:1:1 and 3:1:1. In a preferred embodiment the citric acid:malic acid:succinic acid weight ratio is 4:1:1.

The preferred isoleucine:leucine molar ratio is comprised in the range 0.2-0.7, preferably in the range 0.30-0.60 and/or the preferred valine:leucine weight ratio is comprised in the range 0.2-0.70, preferably in the range 0.30-0.65.

The threonine:leucine molar ratio may be comprised in the range of 0.10-0.90, preferably in the range 0.20-0.70 and/or the lysine:leucine weight ratio is comprised in the range of 0.20-1.00, preferably in the range 0.40-0.90.

In a preferred embodiment, the ratio between the overall molar amount of citric acid, malic acid, succinic acid and the overall molar amount of methionine, phenylalanine, histidine and tryptophan is higher than 1.35.

In one or more embodiments, the weight ratio between the sum of citric acid, malic acid, succinic acid and the sum of the branched-chain amino acids leucine, isoleucine, valine is comprised between 0.1 and 0.4, preferably between 0.15 and 0.35.

In a further embodiment, the overall weight amount of the branched-chain amino acids leucine, isoleucine, valine plus threonine and lysine is higher than the overall weight amount of the three acids citric acid, malic acid, succinic acid. Preferably, the weight amount of the single acids (citric acid, succinic acid or malic acid) is less than the weight amount of each of the single amino acids leucine, isoleucine, valine, threonine and lysine.

In a further embodiment, the overall molar amount of lysine and threonine is higher than the overall molar amount of the three acids citric acid, succinic acid, malic acid. Preferably, the ratio between the overall molar amount of the three acids citric acid, succinic acid, malic acid and the overall molar amount of lysine and threonine is comprised between 0.1 and 0.7, preferably between 0.15 and 0.55.

In one or more embodiments, the composition herein disclosed further comprises vitamins, preferably selected in the group of vitamins B, such as vitamin $B_1$ and/or vitamin $B_6$. In addition, the composition may further include carbohydrates and/or flavouring substances.

In one or more embodiments, the composition may be a pharmaceutical composition further comprising a pharmaceutically acceptable vehicle. The composition may also comprise pharmaceutically acceptable excipients, like for example proteins, vitamins, carbohydrates, natural and artificial sweeteners and/or flavoring substances. In a preferred embodiment, the pharmaceutically acceptable excipients may be selected from whey proteins, maltodextrins, fructose, calcium caseinate, fish oil, citric acid or salts thereof, sucralose, sucrose esters, vitamin D3, group B vitamins.

In one or more embodiments, the active agent of the composition may further contain at least one chemotherapeutic agent. The chemotherapeutic agent may be selected in the group consisting of anthracyclines, HER2/ErbB2 inhibitors, tyrosine-kinase inhibitors, vascular endothelial growth factor inhibitors, immune checkpoint inhibitors. The anthracyclines may be selected in the group consisting of doxorubicin, epirubicin, daunorubicin, idarubicin, pixantrone, sabarubicin, valrubicin, derivatives thereof.

Furthermore, in particular when preparing the compositions according to the instant disclosure, and specifically the active agent, the amino acid arginine is to be avoided. In addition, further amino acids specifically excluded by the composition herein disclosed are serine, proline, alanine. Such amino acids can be counterproductive or even harmful in some concentrations or stoichiometric ratios within the composition.

The amino acids disclosed in the instant description can be replaced by respective pharmaceutically acceptable derivatives, namely salts.

In one or more embodiments, the compositions herein disclosed may be used in the prevention and/or treatment of cardiomyopathy and/or heart failure induced by chemotherapeutic agents in a subject undergoing chemotherapy.

For oral use, the compositions according to the description may be in the form of tablets, capsules, granules, gel, jellifying powder, powder.

The disclosure also provides a method for preventing and/or treating cardiotoxicity induced by chemotherapeutic agents in a subject undergoing chemotherapy, preferably by preventing mitochondrial dysfunction and oxidative stress, the method comprising selecting a composition comprising an active agent, said active agent containing the amino acids leucine, isoleucine, valine, threonine, lysine, and the carboxylic acids citric acid, succinic acid, and malic acid, and administering the composition to the subject. The active agent may further comprise one or more amino acids selected in the group consisting of histidine, phenylalanine, methionine, tryptophan, cysteine, tyrosine, as disclosed herein.

The composition may be administered alone, thus the method consists in selecting the composition and administering the composition to the subject. In one or more embodiments, the composition may be administered in combination—simultaneously, sequentially or separately—with at least one chemotherapeutic agent. The chemotherapeutic agent may be selected in the group consisting of anthracyclines, HER2/ErbB2 inhibitors, tyrosine-kinase inhibitors, vascular endothelial growth factor inhibitors, immune checkpoint inhibitors, The anthracyclines may be preferably selected in the group consisting of doxorubicin, epirubicin, daunorubicin, idarubicin, pixantrone, sabarubicin, valrubicin, derivatives thereof.

Further specifications, in terms of amounts and ratios among the various amino acids provided for by the compositions are contained in the attached claims, which form an integral part of the technical teaching provided herein in relation to the invention.

EXAMPLES

Table 1 shows two different amino acid-based compositions tested on HL-1 cells as disclosed below. The two compositions are the "BCAAem" composition, as also disclosed in document EP 2 196 203 B 1, and the "α5" composition comprising an active agent containing amino acids and citric acid, succinic acid and malic acid.

TABLE 1

| Composition (% w/w) | BCAAem | α5 |
|---|---|---|
| L-Leucine | 30.01 | 31.0885 |
| L-Lysine HCl chlorhydrate | 19.58 | 16.9030 |
| L-Isoleucine | 15.00 | 10.3628 |
| L-Valine | 15.00 | 10.3628 |
| L-Threonine | 8.40 | 7.2540 |
| L-Cysteine | 3.60 | 3.1089 |
| L-Histidine | 3.60 | 3.1089 |
| L-Phenylalanine | 2.40 | 2.0726 |
| L-Methionine | 1.20 | 1.0363 |
| L-Tyrosine | 0.72 | 0.6218 |
| L-Tryptophan | 0.48 | 2.0726 |
| Citric acid | — | 8.001 |
| Succinic acid | — | 2.00 |
| Malic acid | — | 2.00 |

TABLE 1-continued

| Composition (% w/w) | BCAAem | α5 |
|---|---|---|
| Vitamin B1 (thiamine chlorhydrate) | — | 0.004 |
| Vitamin B6 (piridoxine chlorhydrate) | — | 0.0038 |

The compositions of Table 1 above may be prepared first by sifting all the components with a 0.8 mesh. To obtain a pre-mixture, each ingredient (in an amount <10% by weight of the total amount) is put in a polyethylene bag together with a portion of L-lysine HCl so as to obtain about 10% of the weight of the total composition. The bag is then manually shaken for 5 minutes. The pre-mixture is then loaded in a mixer (Planetaria) together with the remainder of the ingredients and mixed for a period of 15 minutes at 120 rpm to obtain a homogeneous final composition.

Methods

Cell Cultures and Treatments

Figure 1:
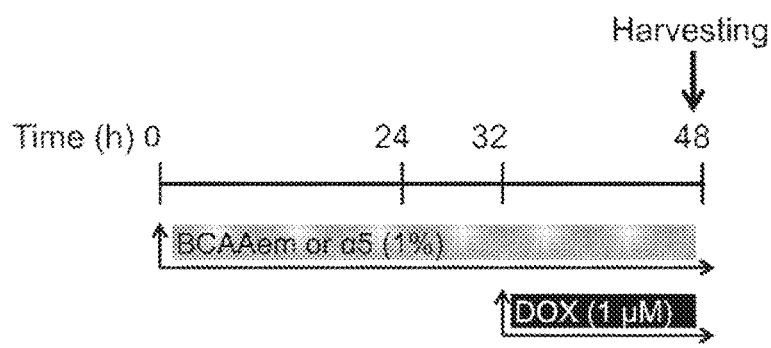
FIG. 1 is a scheme showing the HL-1 cardiac cell treatment.

Rules of the Declaration of Helsinki have been followed. HL-1 cardiomyocytes were obtained from W.C. Claycomb (Millipore Cat #SCC065) and plated in fibronectin/gelatin-coated flasks, grown to 70-80% confluence in Claycomb medium (Sigma-Aldrich) supplemented with 100 µM norepinephrine (from a 10 mM norepinephrine [Sigma-Aldrich] stock solution dissolved in 30 mM L-ascorbic acid [Sigma-Aldrich]), 2 mM L-glutamine, 100 U/ml penicillin, 100 µg/ml streptomycin and 10% Fetal Bovine Serum (FBS, Sigma-Aldrich) [2,3]. MCF-7 human breast cancer cell line (ATCC® HTB-22™) also available from P. Limonta (Pharmacological and Biomolecular Sciences, University of Milan, Milan, Italy) were cultured in pH 7.4 DMEM, containing streptomycin (100 U/ml), penicillin (200 mg/ml), and gentamicin (50 mg/ml), and supplemented with 10% FBS. Both cell types were treated with 1 BCAAem or α5 for 48 h and 1 µM DOX for 16 h (FIG. 1). The detailed composition percentages of mixtures are shown in Table 1.

For the study of phospho-proteins, HL-1 cells were treated with 1% α5 for 2 h and 1 µM DOX (Doxo-HCl from Sigma-Aldrich D15D15) for the last 60 min. For Klf15, eNOS, and Raptor knockdown experiments, HL-1 cells were transfected with 50-100 nM Klf15, eNOS, and Raptor siRNA SMARTpool (Dharmacon; Lafayette, CO) or siGENOME nontargeting siRNA using Dharmafect 1 transfection reagent. After 24 h transfection, cells were treated with 1% α5 for 24 h and 1 µM DOX for 16 h. Transfection efficacy was determined with siGLO-RISC-free nontargeting siRNA and siRNA uptake by fluorescence detection (absorbance/emission 557/570). Proteins were then extracted for Western blotting analysis.

Animals and Treatments

Figure 2:
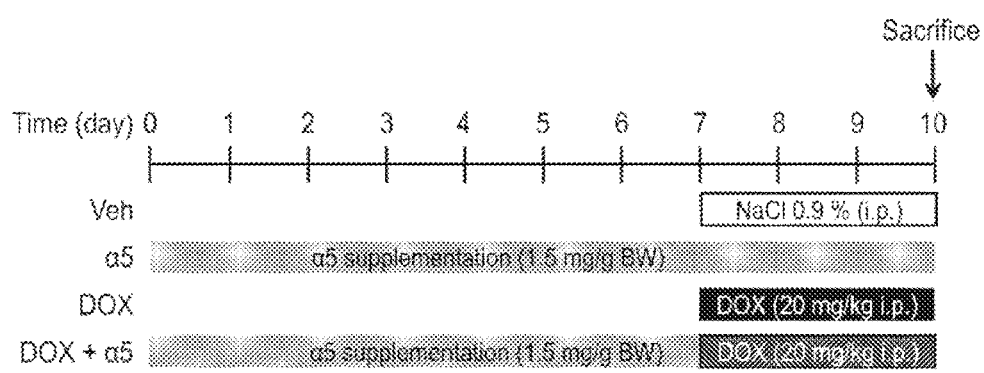
FIG. 2 is a scheme showing the in vivo mouse treatment.

The experimental protocol used was approved by the Institutional Ethical Committee of Milan University (n. 16/09) and complied with the National Animal Protection Guidelines. Forty male C57BL6/J mice (9 weeks-old) were housed separately in clean polypropylene cages and divided into four groups (FIG. 2): 1) the control group (CTRL, n=10 mice) fed with standard diet (4.3 kcal % fat, 18.8 kcal % protein, 76.9 kcal % carbohydrate; Laboratorio Dottori Piccioni) and receiving a single i.p. saline injection (vehicle); 2) the α5 group (n=10 mice) fed with standard diet and α5 supplementation (1.5 mg/g body weight/day in drinking water) receiving a single i.p. saline injection (vehicle). α5 composition was dissolved in tap water, after calculating the average daily drinking volume 2 weeks before the start of treatment and stored at 4° C. before daily administration; 3) the DOX group (n=10 mice) fed with standard diet and receiving i.p. DOX (Doxo-HCl from Sigma-Aldrich) injection at 20 mg/kg, a dose that had been shown cardiotoxic [4-6]; and 4) the DOX plus α5 group (n=10 mice) fed with standard diet and receiving i.p. 20 mg/kg DOX injection plus a 5 supplementation (1.5 mg/g body weight/day in drinking water). α5 supplementation was performed for 10 days, with a 12 h light/12 h dark cycle at 22° C. in a quiet, temperature- and humidity-controlled room; single dosing of DOX was performed on the third day before the end of α5 treatment (FIG. 2). Drinking volume, food intake, and body weight were checked twice weekly. At the end of the treatment period, mice were sacrificed by cervical dislocation and hearts quickly removed and freshly used (for oxygen consumption analysis) or frozen in liquid nitrogen and stored at ~80° C. (for mtDNA, mRNA, and protein level measurement, in addition to citrate synthase activity analysis).

Quantitative RT-PCR Analysis

Quantitative RT-PCRs were performed as previously described [3-7] with the iQ SybrGreenl SuperMix (Bio-Rad; Segrate, Italy) on an iCycler iQ real-time PCR detection system (Bio-Rad). Briefly, RNA was isolated from left ventricle using the RNeasy Tissue Mini Kit (Qiagen) or from HL-1 cells using the RNeasy Mini Kit (Qiagen). cDNA was synthesized using the iScript cDNA Synthesis Kit (Bio-Rad Laboratories). Primers were designed with Beacon Designer 2.6 software from Premier Biosoft International and are shown in Table 2.

TABLE 2

| Gene | | | SEQ ID. | PCR product (bp) | $T_a$ (° C.) |
|---|---|---|---|---|---|
| Cat | CACTGACGAGATGGCACACTTTG | Sense Primer (5'-3') | No. 1 | 173 | 60 |
| | TGGAGAACCGAACGGCAATAGG | Antisense Primer (5'-3') | No. 2 | | |
| COX IV | TGGGACTATGACAAGAATGAGTGG | Sense Primer (5'-3') | No. 3 | 113 | 60 |
| | TTAGCATGGACCATTGGATACGG | Antisense Primer (5'-3') | No. 4 | | |
| cyt c | ATAGGGGCATGTCACCTCAAAC | Sense Primer (5'-3') | No. 5 | 172 | 60 |
| | GTGGTTAGCCATGACCTGAAAG | Antisense Primer (5'-3') | No. 6 | | |
| eNOS | AGCGGCTGGTACATGAGTTC | Sense Primer (5'-3') | No. 7 | 116 | 60 |
| | GATGAGGTTGTCCTGGTGTCC | Antisense Primer (5'-3') | No. 8 | | |
| GPX1 | TCTGGGACCTCGTGGACTG | Sense Primer (5'-3') | No. 9 | 156 | 60 |
| | CACTTCGCACTTCTCAAACAATG | Antisense Primer (5'-3') | No. 10 | | |
| KLF15 | ACACCAAGAGCAGCCACCTC | Sense Primer (5'-3') | No. 11 | 130 | 60 |
| | TGAGATCGCCGGTGCCTTGA | Antisense Primer (5'-3') | No. 12 | | |
| mtDNA | CCACTTCATCTTACCATTTA | Sense Primer (5'-3') | No. 13 | 106 | 54 |
| | ATCTGCATCTGAGTTTAATC | Antisense Primer (5'-3') | No. 14 | | |
| NRF1 | ACAGATAGTCCTGTCTGGGGAAA | Sense Primer (5'-3') | No. 15 | 99 | 60 |
| | TGGTACATGCTCACAGGGATCT | Antisense Primer (5'-3') | No. 16 | | |
| PGC-1α | ACTATGAATCAAGCCACTACAGAC | Sense Primer (5'-3') | No. 17 | 148 | 60 |
| | TTCATCCCTCTTGAGCCTTTCG | Antisense Primer (5'-3') | No. 18 | | |
| SESN2 | GCCCCTGAGAAGCTCCGCAA | Sense Primer (5'-3') | No. 19 | 129 | 60 |
| | GAGTTCGGCCAGGGACCAGC | Antisense Primer (5'-3') | No. 20 | | |
| SOD1 | GGCTTCTCGTCTTGCTCTC | Sense Primer (5'-3') | No. 21 | 153 | 60 |
| | AACTGGTTCACCGCTTGC | Antisense Primer (5'-3') | No. 22 | | |
| SOD2 | GCCTCCCAGACCTGCTTAC | Sense Primer (5'-3') | No. 23 | 131 | 60 |
| | GTGGTACTTCTCCTCGGTGGCG | Antisense Primer (5'-3') | No. 24 | | |
| TBP | ACCCTTCACCAATGACTCCTATG | Sense Primer (5'-3') | No. 25 | 186 | 60 |
| | TGACTGCAGCAAATCGCTTGG | Antisense Primer (5'-3') | No. 26 | | |
| Tfam | AAGACCTCGTTCAGCATATAACATT | Sense Primer (5'-3') | No. 27 | 104 | 60 |
| | TTTTCCAAGCCTCATTTACAAGC | Antisense Primer (5'-3') | No. 28 | | |

TABLE 2-continued

| Gene | | | SEQ ID. | PCR product (bp) | $T_a$ (° C.) |
|---|---|---|---|---|---|
| 18S | CTGCCCTATCAACTTTCGATGGTAG | Sense Primer (5'-3') | No. 29 | 100 | 60 |
|  | CCGTTTCTCAGGCTCCCTCTC | Antisense Primer (5'-3') | No. 30 | | |

$T_a$ temperature of annealing (° C.);
Cat, catalase;
COX IV, cytochrome c oxidase subunit IV;
cyt c, cytochrome c;
eNOS, endothelial nitric oxide synthase;
GPX1, glutathione peroxidase 1;
KLF15, Krüppel-like factor 15;
mtDNA, mitochondrial DNA;
NRF1, nuclear respiratory factor 1;
PGC-1α, peroxisome proliferator-activated receptor a coactivator 1-α;
SESN2, sestrin 2;
SOD1, superoxide dismutase 1;
SOD2, superoxide dismutase 2;
TBP, TATA-binding protein;
Tfam, mitochondrial transcription factor A;
18S, 18S ribosomal RNA.
Accession number Cat: NM_009804.2;
Accession number COX IV: NM_009941;
Accession number Cyt c: NM_007808;
Accession number eNOS: NM_008713.4;
Accession number GPX1: NM_008160.6;
Accession number KFL15: NM_023184.4;
*Mus musculus* Mitochondrial,
complete genome: NC_005089.1;
Accession number NRF1: AF098077;
PGC-1α: : AF049330;
Accession number SESN2: NM_144907.1;
Accession number SOD1: NM_011434;
Accession number SOD2: NM_013671;
Accession number TBP: NM_013684.3;
Accession number Tfam: NM_009360.4;
Accession number 18S: X03205.

The cycle number at which the various transcripts were detectable (threshold cycle, CT) was compared to that of TBP, referred to as ΔCT. The relative gene level was expressed as $2^{-(\Delta\Delta CT)}$, in which AΔCT equals the ΔCT of DOX-, α5-, or DOX plus α5-treated mice (or treated HL-1 cells) minus the ΔCT of the control mice (or untreated HL-1 cells).

Western Blot Analysis

Protein extracts were obtained from left ventricle with T-PER mammalian protein extraction reagent (Pierce, ThermoScientific, Rockford, USA) or from HL-1 cells in M-PER mammalian protein extraction reagent (Pierce, ThermoScientific, Rockford, USA), as indicated by the manufacturer, in the presence of 1 mM NaVO4, 10 mM NaF and a cocktail of protease inhibitors (Sigma-Aldrich, Milan, Italy). Protein content was determined by the bicinchoninic acid protein assay (BCA, Pierce, Euroclone, Milan, Italy), and 50 of the protein extract was separated by SDS-PAGE under reducing conditions. The separated proteins were then electrophoretically transferred to a nitrocellulose membrane (Bio-Rad Laboratories, Segrate, Italy) [3-8]. Proteins of interest were detected with specific antibodies: anti-COX IV (cytochrome c oxidase subunit IV, Cell Signaling Technology Cat #4844, Euroclone, Milan, Italy), anti-cyt c (cytochrome complex, Cell Signaling Technology Cat #4280), anti-PGC-1α (proliferator-activated receptor γ coactivator 1α, Cell Signaling Technology Cat #2178), anti-phospho-AKT (Ser473) (Cell Signaling Technology Cat #4060), anti-AKT (Cell Signaling Technology Cat #4685), anti-phospho-eNOS (Ser1177) (phospho-endothelial nitric oxide synthase, Cell Signaling Technology Cat #9571), anti-eNOS (Cell Signaling Technology Cat #9572), anti-phospho-S6 (Ser235/236) (phospho-S6, Cell Signaling Technology Cat #4858), anti-S6 (Cell Signaling Technology Cat #2217), anti-phospho-mTOR (Ser2481) (Cell Signaling Technology Cat #2974), anti-mTOR (Cell Signaling Technology Cat #2972), anti-phospho-BCKDH (Ser293) (Abcam Cat #200577), anti-BCKDH (Abcam Cat #138460), and anti-GAPDH (1:1000, Cell Signaling Technology Cat #2118) at 1:1000 dilution each. After the visualization of phospho-eNOS, phospho-AKT, phospho-mTOR, phospho-S6, and anti-phospho-BCKDH the filters were stripped with the Restore™ western blot stripping buffer (Euroclone, Milan, Italy) and further used for the visualization of total eNOS, total AKT, total mTOR, total S6, or total BCKDH. Immunostaining was performed using horseradish peroxidase-conjugated anti-rabbit or anti-mouse immunoglobulin for 1 h at room temperature. The protein was detected using SuperSignal substrate (Pierce, Euroclone, Milan, Italy) and quantified by densitometry with ImageJ image analysis software.

Mitochondrial DNA

For mtDNA analysis, total DNA was extracted with a QIAamp DNA Extraction Kit (Qiagen). mtDNA was amplified using primers specific for the mtDNA and normalized to the 18S gene (Table 2) [9]. The mtDNA content was determined using qRT-PCR by measuring the threshold cycle ratio (ΔCT) of the mtDNA gene vs. that of a nuclear encoded gene (18S) in left ventricle of DOX-, α5- or DOX plus α5-treated mice, in addition to control untreated mice [10,11].

Citrate Synthase Activity

The activity was measured spectrophotometrically at 412 nm at 30° C. in left ventricle extracts [12,13]. Tissue was added to buffer containing 0.1 mM 5,5-dithio-bis-(2-nitrobenzoic) acid, 0.5 mM oxaloacetate, 50 µM EDTA, 0.31 mM acetyl CoA, 5 mM triethanolamine hydrochloride, and 0.1 M Tris-HCl (pH 8.1). Citrate synthase activity was expressed as nmol citrate produced per min per mg of protein. The data were normalized to total protein content, which was determined by the bicinchoninic acid assay, as reported above.

Oxygen Consumption

Oxygen consumption was measured as described [14,15]. Mitochondria were isolated from left ventricle of control and treated-mice. Samples were analyzed at 37° C. in a gas-tight vessel equipped with a Clark-type oxygen electrode (Rank Brothers Ltd.) connected to a chart recorder. The oxygen electrode was calibrated assuming the concentration of oxygen in the incubation medium as 200 µmol/l at 37° C.

Mitochondrial Oxidative Stress

To investigate the mitochondrial oxidative stress, mitochondria were isolated using the Qproteome Mitochondria isolation kit (Qiagen). Mitochondrial $H_2O_2$ release was measured in the presence of horseradish peroxidase (HRP), using the Amplex Red Hydrogen Peroxide/Peroxidase Assay kit (Molecular Probes). Fluorometric measures were made using a Fusion Universal Microplate Analyzer (Packard/PerkinElmer) with excitation filter at 550 nm and emission filter at 590 nm. $H_2O_2$ production, calculated from a standard curve, was expressed as nmol/min/mg protein as described [9] Moreover, mitochondrial aconitase and SOD activity were measured as previously described [16]. Briefly, the formation of NADPH was followed spectrophotometrically (340 nm) at 25° C. (for aconitase activity), while SOD activity was measured with the Superoxide Dismutase Assay Kit (Calbiochem). One unit of SOD activity was defined as the amount of the enzyme needed to exhibit 50% dismutation of the superoxide radical. Finally, the oxidative damage of DNA was measured as a further marker of oxidative stress. The highly sensitive 8-hydroxy-2'-deoxyguanosine (8-OHdG) Check ELISA Kit (JaICA, Hamamatsu, Japan) was used [17]. Measurements were carried out in accordance with the manufacturer's protocol. Total DNA was extracted using QlampDNAMini Kit (Qiagen) and digested with nuclease P1 and alkaline phosphatase (Sigma). Quality and quantity of DNA were confirmed by a NanoDrop ND-1000 spectrophotometry analysis. Absorbance of the ELISA reaction product was determined spectrophotometrically using 450 nm as the primary wave.

Viability Assay

HL-1 cell viability was assessed by MTT [3-(4,5-dimethylthiazol-2-yl)-2,5-diphenyltetrazolium bromide] reagent (Sigma, Milan, Italy). HL-1 were seeded into 96-well culture plates at density 20,000 cells/well (100 µl). The purple formazan crystals were dissolved in 5% SDS/0.1 M HCl (100 µl/well), and the absorbance was recorded on a microplate reader (ELx800, BioTek Instruments, VT, USA) at a wavelength of 570 nm. Each test was repeated at least four times in quadruplicates.

Acid Phosphatase Assay

To quantify MCF7 cell growth, acid phosphatase assay was used as described [30]. Briefly, MCF7 cells were placed in 96-well plates at 5,000 to 20,000 cells per well density and treated with 1% α5 (for 48 h) and 1 µM DOX (for 16 h). Culture medium was removed and each well washed once with phosphate-buffered saline (PBS, pH 7.2), and added with 100 µl buffer containing 0.1 M sodium acetate (pH 5.0), 0.1% Titon X-100, and 5 mM p-nitrophenyl phosphatase (pNPP). Then, plates were placed in a 37° C. incubator for 2 h. The reaction was stopped with the addition of 10 µl 1 N NaOH, and color development was assessed at 405 nm. Nonenzymatic pNPP hydrolysis was measured in wells without cells.

Statistical Analysis and Data Presentation

Statistical analysis was performed with a one-way ANOVA followed by Student-Newman-Keuls' test or Student's t-test. Data are presented as the means±standard deviations (SD), unless otherwise specified. A statistically significant difference was accepted at $p<0.05$.

Results

Figure 3:
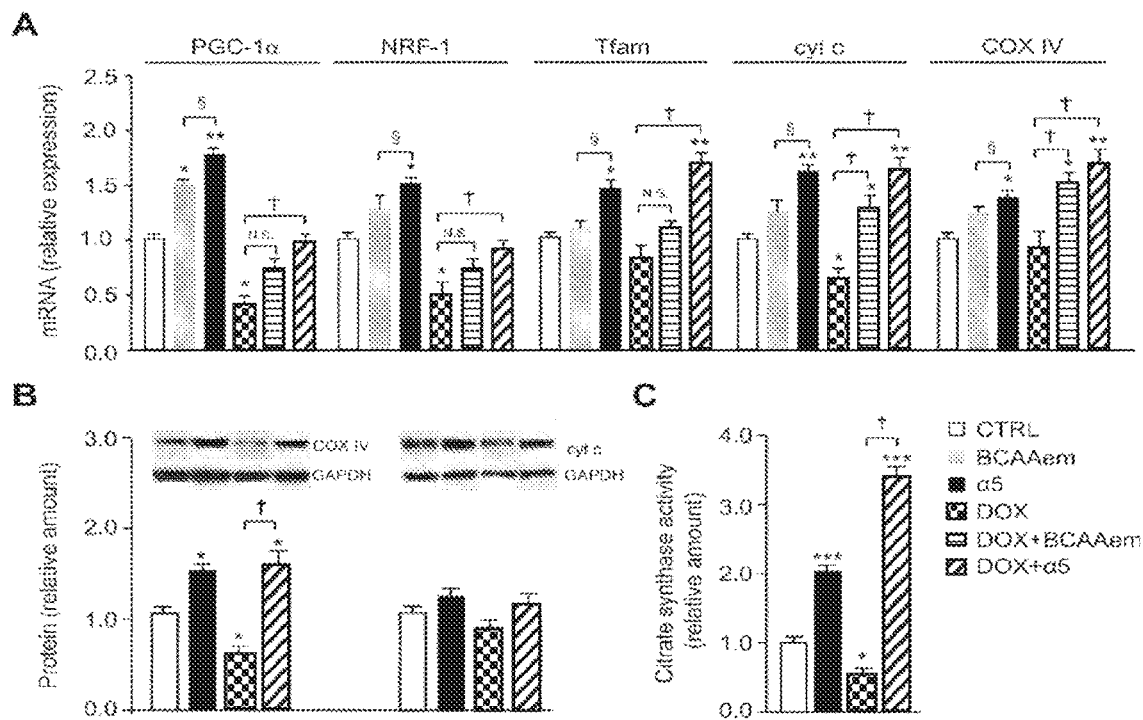
FIG. 3 shows that specific amino-acid compositions prevent mitochondrial dysfunction in HL-1 cardiomyocytes acutely exposed to DOX. (A) Mitochondrial biogenesis marker expression: peroxisome proliferator-activated receptor-γ coactivator 1α (PGC1-α), nuclear respiratory factor-1 (NRF1), transcription factor A (Tfam), cytochrome c (cyt c), and cytochrome c oxidase subunit IV (COX IV) mRNA levels were analysed by quantitative RT-PCR. Relative expression values for the untreated (CTRL) cells were taken as 1.0 (n=5 experiments). (B) COX IV and cyt c protein levels were detected by immunoblot analysis. The relative values were determined by densitometric analysis relative to GAPDH levels; values for untreated (CTRL) cells were taken as 1.0 (n=5 experiments). (C) Citrate synthase activity. The values were normalized to protein content (n=3 experiments). $*p<0.05$, $p<0.01$, and $*p<0.001$ vs. untreated cells; $\dagger p<0.01$ vs. DOX-treated cells; § $p<0.01$ vs. BCAAem-treated cells. All data are presented as the mean±SD.
Figure 4:
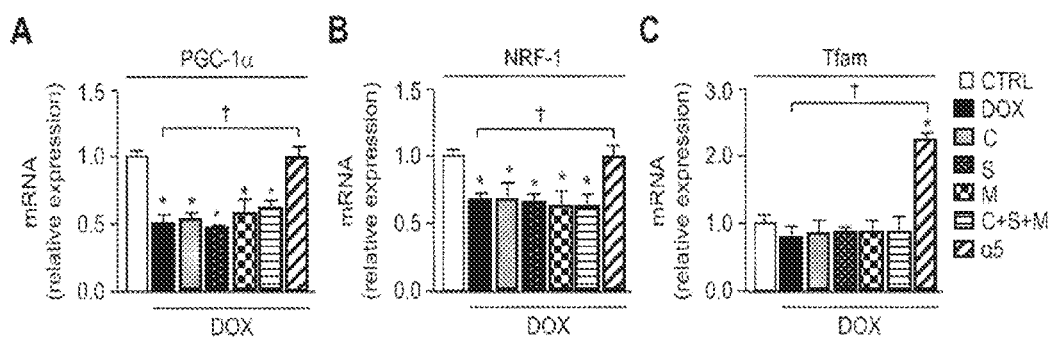
FIG. 4 shows that TCA intermediates do not prevent DOX-induced reduction of mitochondrial biogenesis genes in HL-1 cardiomyocytes. (A-C) Peroxisome proliferator-activated receptor-γ coactivator 1α (PGC-1α) (A), nuclear respiratory factor-1 (NRF1) (B), and transcription factor A (Tfam) (C). mRNA levels were analysed by quantitative RT-PCR. Relative expression values for the untreated (CTRL) cells were taken as 1.0 (n=3 experiments). C, citric acid; S, succinic acid, M, malic acid. $*p<0.05$ vs. untreated cells. All data are presented as the mean±SD.
Figure 5:
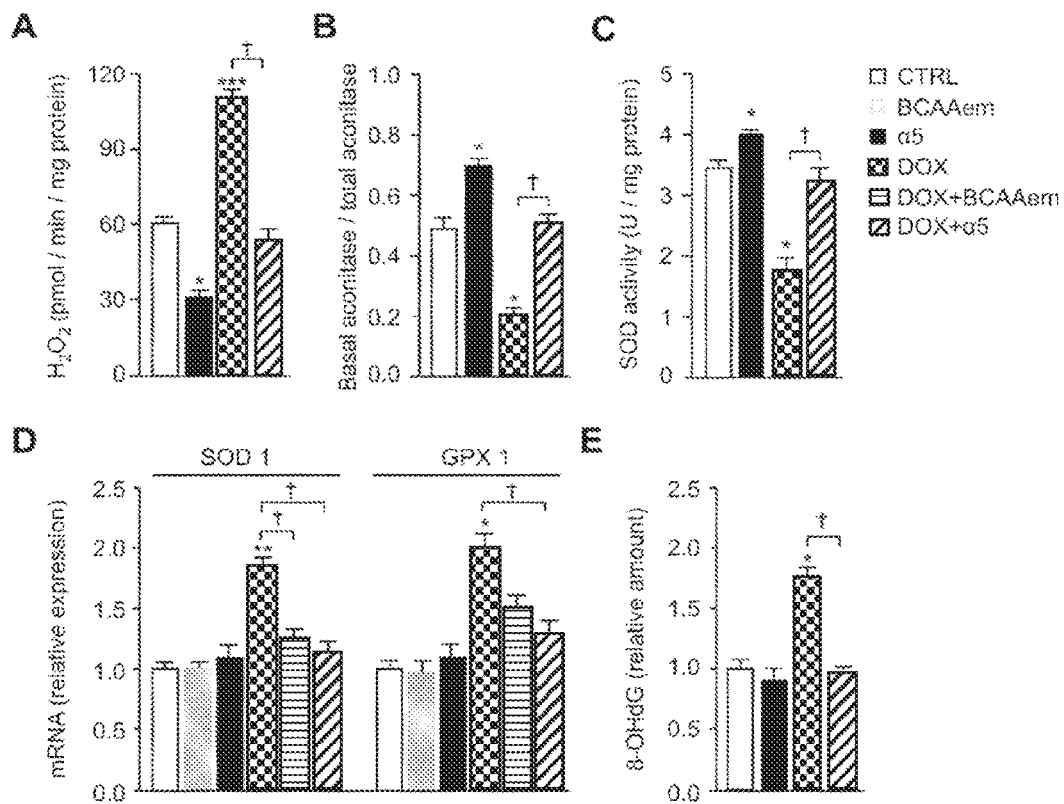
FIG. 5 shows that α5 supplementation prevents DOX-induced oxidative stress in HL-1 cardiomyocytes. (A) Mitochondrial $H_2O_2$ release, (B) basal aconitase/total aconitase ratio, and (C) superoxide dismutase activity (SOD) in HL-1 cells (n=3 experiments). (D) superoxide dismutase 1 (SOD1) and glutathione peroxidase 1 (GPX1) mRNA levels were analysed by quantitative RT-PCR. Relative expression values for the untreated (CTRL) cells were taken as 1.0 (n=5 experiments). (E) Total DNA oxidative damage measured as 8-hydroxy-2'-deoxyguanosine (8-OHdG) production in untreated (CTRL) cells and DOX-treated cells (n=3 experiments). $*p<0.05$, $p<0.01$, and $*p<0.001$ vs. untreated cells; $\dagger p<0.01$ vs. DOX-treated cells. All data are presented as the mean±SD.

Specific Amino Acid-Based Composition Prevents Mitochondrial Dysfunction in HL-1 Cardiomyocytes Acutely Exposed to DOX To protect cardiomyocytes against DOX toxicity, the impaired mitochondrial function and oxidative stress in HL-1 cells exposed to the chemotherapeutic has been corrected. An optimal combination of relevant metabolic precursors capable of maximally increase oxidative metabolism in HL-1 cardiomyocytes was evaluated. Specifically, the effect of two amino acid-based compositions (Table 1) were tested on differentiating HL-1 cells. For this screening, differentiating cardiomyocytes were treated for 48 h with 1) a composition comprising branched-chain amino acids (i.e., BCAAem) or 2) the composition object of the instant application "α5", which also comprises tricarboxylic acids, with or without DOX (FIG. 1). While α5 (1% w/v) increased the mRNA levels of mitochondrial biogenesis markers in HL-1 cells, including PGC-1α, nuclear respiratory factor 1 (NRF1), mitochondrial transcription factor A (Tfam), cytochrome c (cyt c), and cytochrome c oxidase complex IV (COX IV) over the basal value, only PGC-1α expression was increased by BCAAem (FIG. 3A). Conversely, the expression of these genes was decreased when cardiomyocytes were exposed to 1 µM DOX for 16 h (FIG. 3A). Notably, α5 supplementation prevented this DOX toxicity with a complete rescue of the gene expression (FIG. 3A). Except for cyt c and COX IV, BCAAem was unable to reverse the DOX effect with statistical significance (FIG. 3A). Hence, the α5 composition was used hereafter. Notably, FIG. 4 shows that TCA intermediates—citric acid, succinic acid, and malic acid supplemented individually or all together at the same concentrations in α5—were unable to prevent the DOX-induced reduction of mitochondrial biogenesis as well as to change the mitochondrial gene expression when supplemented alone. The protective capacity of α5 supplementation on mitochondrial health was also evident at the protein level (e.g., COX IV and, with a trend, cyt c) (FIG. 3B). Additionally, the reduction of citrate synthase activity promoted by DOX exposure—which is an index of reduced mitochondrial mass and function—was fully antagonized by α5 supplementation, which raised the enzyme activity also when added alone to the HL-1 cells (FIG. 3C). These healthy effects of α5 on the DOX-induced mitochondrial damage were further confirmed by the reduction of oxidative stress. When compared to untreated cells, 14202 release (an index of mitochondrial superoxide anion production) was markedly increased by DOX treatment; α5 supplementation prevented this effect (FIG. 5A). α5 reduced $H_2O_2$ release also when added alone. Accordingly, measurements of mitochondrial ROS production (as assessed by the basal/total aconitase activity ratio) and ability to eliminate superoxides through SOD activity demonstrated that α5 supplementation prevented the oxidative stress induced by DOX, with beneficial effects also when added alone (FIG. 5, B and C). Because oxidative stress ignites the anti-ROS defense system, the expression of anti-ROS enzymes were investigated. In particular, the expression of glutathione peroxidase 1 (GPX1) and superoxide dismutase 1 (SOD1) genes was increased in DOX-treated compared to untreated HL-1 cells (FIG. 5D), consistently with the increase of ROS production.

Figure 6:
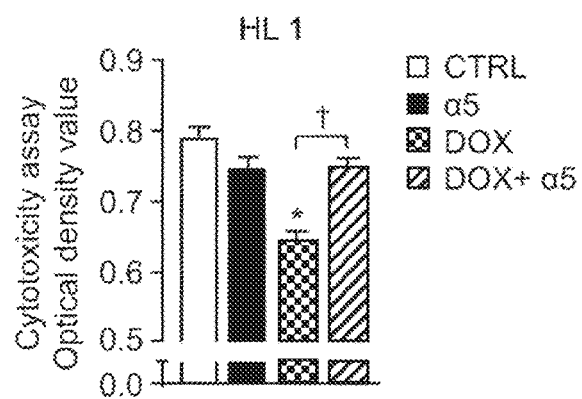
FIG. 6 shows that α5 composition prevents DOX-induced death of HL-1 cells. Cytotoxicity of HL-1 cardiomyocytes was evaluated with the MTT assay. Cells were treated with 1% α5 for 48 h and 1 μM DOX for 16 h. $*p<0.05$ vs. untreated cells; $\dagger p<0.05$ vs. DOX-treated cells. All data are presented as the mean±SD.

This was confirmed by the higher amount of 8-hydroxy-2'-deoxyguanosine (8-OHdG), a marker of oxidative DNA damage, in cells exposed to DOX (FIG. 5E). The α5 supplementation in DOX-treated cells was able to counteract ROS production as evidenced by reduced expression of both SOD1 and GPX1 genes (FIG. 5D) and by restored 8-OHdG production to amount observed in the untreated cells (FIG. 5E). FIG. 5D shows moreover that α5 is more effective than BCAAem in the anti-ROS protection. Together, these results support the notion that α5 mixture can prevent mitochondrial damage induced by acute exposure to DOX in HL-1 cardiomyocytes. Notably, this might be of relevant impact on cell survival. The DOX-induced death of HL-1 cells in fact was prevented by α5 mixture when supplemented together (FIG. 6). No effect was evident on the cell survival when HL-1 cells were exposed to α5 alone (FIG. 6).

α5 Composition Prevents Mitochondrial Dysfunction in Heart of DOX-Treated Mice

To confirm the in vitro results, an acute in vivo DOX treatment was performed as described [6]. On the third day before the end of the α5 treatment—which was performed for 10 days—a single i.p. injection of 20 mg/kg DOX was done (FIG. 2). Table 3 shows that DOX treatment significantly decreased body weight and heart weight as compared to the control group, and this might depend on its marked anorexigenic effect. α5 was unable to modify body weight, heart weight, and food intake both when supplemented alone and with DOX (Table 3). On the contrary, while water consumption in DOX-treated mice was unchanged compared to control animals, α5 increased water intake either when supplemented alone or with DOX.

7E). Finally, the results reported in FIG. 7F confirmed in ex vivo samples that the DOX augmented the expression of ROS defense enzymes, including SOD1, SOD2, catalase, and GPX1, while the α5 supplementation blocked almost completely this effect. No changes were seen in mice treated with α5 alone (FIG. 7F). Collectively, these findings suggest that α5 supplementation prevents the DOX-induced mitochondrial toxicity in heart, at least in part, by promoting mitochondrial biogenesis and function, as well as by reducing oxidative stress.

Figure 8:
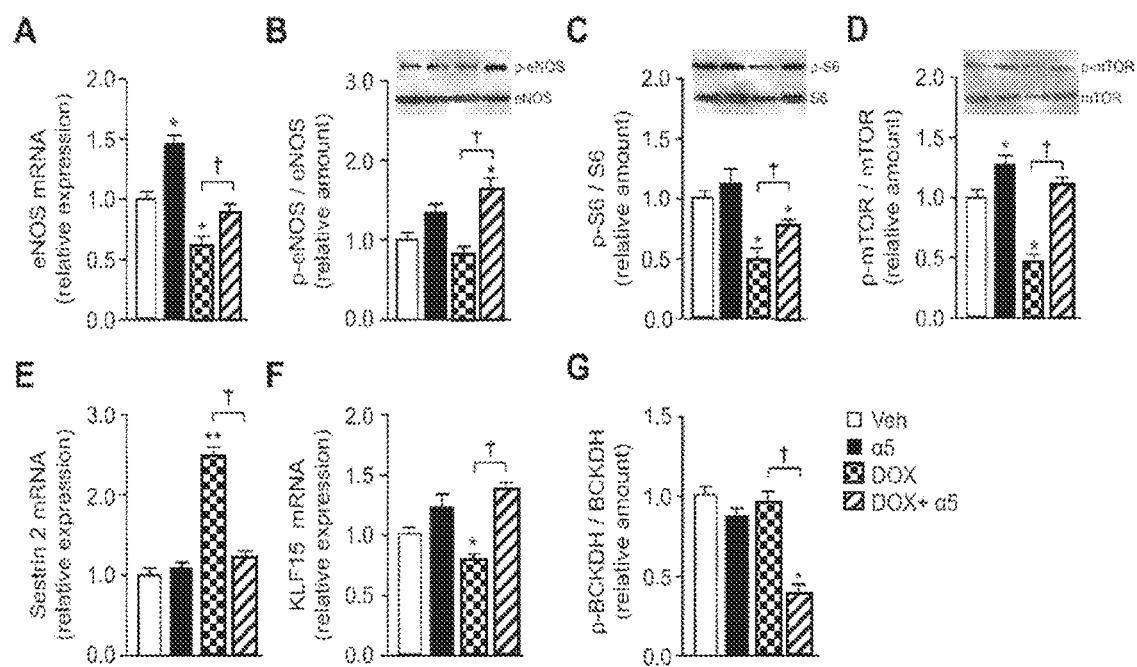
FIG. 8 shows that different signaling pathways are implicated in the protective effects of α5 supplementation in DOX-treated mice. (A, E, and F) Gene expression. (A) Endothelial nitric oxide synthase (eNOS), (E) Sestrin2, and (F) Krüppel-like factor 15 (KLF15) mRNA levels were analysed by quantitative RT-PCR. Relative expression values of the vehicle (Veh)-treated mice were taken as 1.0 (n=5 experiments). (B, C, D, and G) Protein levels. (B) Phospho-eNOS, (C) phospho-S6, (D) phospho-mTOR, and (G) phospho-BCKDH protein levels were detected by immunoblot analysis. The relative values were densitometrically analyzed and reported as ratios to total eNOS, S6, mTOR, and BCKDH levels, respectively. Values for Veh-treated mice were taken as 1.0 (n=5 experiments). $*p<0.05$ and $**p<0.01$ vs. Veh-treated mice; $\dagger p<0.05$ vs. DOX-treated mice. All data are presented as the mean±SD.

Different Signaling Pathways are Implicated in the Protective Effects of α5 Supplementation The signaling pathways in the left ventricle of mice treated with DOX and α5 were analysed. FIGS. 8A and B show that DOX-injection decreased eNOS expression, yet only partially eNOS activity [i.e., (Ser1177)phospho-eNOS to total eNOS ratio]. Notably, the α5 supplementation fully neutralized these effects. When supplemented alone the α5 composition was able to increase eNOS expression (FIG. 8A). Given that the eNOS-dependent nitric oxide (NO) production is in turn known to regulate the mTOR complex 1 (mTORC1) signaling pathway, and that mTORC1 activity is necessary and sufficient for (Ser1177)-eNOS phosphorylation in different cell types, the phosphorylation of S6 as a downstream marker of the mTORC1 activation was measured. DOX treatment decreased (Ser235/236)phospho-S6 to total S6 ratio in the left ventricle when compared to saline injection, while the α5 supplementation at least partially prevented this effect (FIG. 8C). No significant changes were observed with α5 mixture when supplemented alone. Diverse physiological stimuli modulate mTORC1 signaling by site-specific mTOR phosphorylation. The data herein disclosed reveal a functional role for Ser2481 mTOR phosphorylation in DOX and α5 action, in which DOX reduced and α5 rescued this reduction of the selective mTOR phosphorylation in heart (FIG. 8D). mTOR phosphorylation was increased also when α5 was added alone. Together, the

TABLE 3

|  | CTRL | α5 | DOX | DOX + α5 |
|---|---|---|---|---|
| Body weight (g) | 24.84 ± 1.3 | 24.46 ± 2 | 20.75 ± 0.82* | 20.46 ± 1.04* |
| Heart weight (g) | 0.12 ± 0.01 | 0.11 ± 0.02 | 0.085 ± 0.02* | 0.09 ± 0.02* |
| Food intake (g) | 5.2 ± 0.41 | 5.34 ± 0.7 | 3.73 ± 0.6* | 3.59 ± 0.47* |
| Water intake (g) | 6.1 ± 0.7 | 8.24 ± 0.88* | 6.13 ± 1.0 | 7.07 ± 1.3 |

Measurements were done in 10 mice per group. Values represent mean ± D.S.
*p < 0.05 vs. controls (i.e., saline-injected mice).

Figure 7:
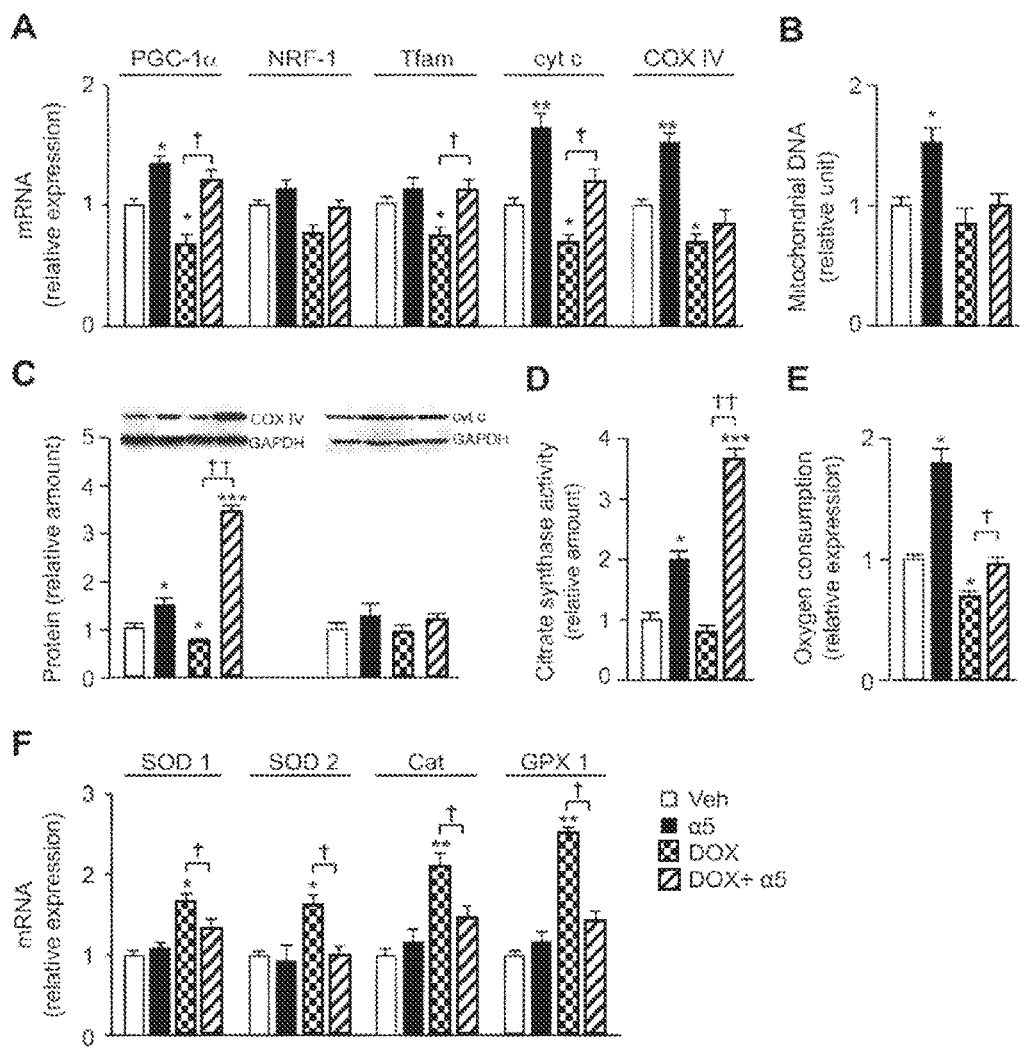
FIG. 7 shows that α5 composition prevents mitochondrial dysfunction in left ventricle of DOX-treated mice. (A and F) Mitochondrial biogenesis marker expression. (A) PGC1-α, NRF1, Tfam, cyt c, COX IV and (F) SOD1, superoxide dismutase 2 (SOD2), catalase (Cat), and GPX1 mRNA levels were analysed by quantitative RT-PCR. Relative expression values for the vehicle-treated (Veh) mice were taken as 1.0 (n=5 experiments). (B) Mitochondrial DNA (mtDNA) amount was analyzed by quantitative RT-PCR. Relative units were expressed in comparison to those for the Veh-treated mice which were taken as 1.0 (n=5 experiments). (C) COX IV and cyt c protein levels were determined by immunoblot analysis. The relative values were determined by densitometric analysis relative to glyceraldehyde-3-phosphate dehydrogenase (GAPDH) levels; values for Veh-treated mice were taken as 1.0 (n=5 experiments). (D) Citrate synthase activity. The values were normalized to protein content (n=3 experiments). (E) Basal oxygen consumption rate. Mitochondria were isolated from left ventricle of mice treated or not with DOX and α5. Oxygen consumption rates were normalized to mitochondrial protein amount (n=3 experiments). $*p<0.05$, $p<0.01$, and $*p<0.001$ vs. Veh-treated mice; $\dagger p<0.05$ and $\dagger\dagger p <0.01$ vs. DOX-treated mice. All data are presented as the mean±SD.

The mRNA levels of mitochondrial biogenesis genes were reduced in the left ventricle of DOX-treated mice as compared to the control group (FIG. 7A). Beyond increasing PGC-1α, cyt c, and COX IV mRNA levels when supplemented alone, the α5 mixture was able to prevent significantly the DOX-induced reduction of PGC-1α, Tfam, and cyt c (FIG. 7A). Mitochondrial mass and function, measured as mitochondrial DNA (mtDNA) amount, respiratory proteins (particularly COX IV), and citrate synthase activity were lower in DOX-treated than in saline-treated mice, and these reductions were prevented when the mice were supplemented with α5 (FIG. 7, B-D). Moreover, the mitochondrial respiratory function was investigated by measuring oxygen consumption rate (OCR) with Clark's electrode in mitochondria isolated from the left ventricle of the diverse treatment groups. FIG. 7E shows that DOX injection decreased OCR, while α5 supplementation fully conserved the mitochondrial respiration of the DOX-treated mice. The amino acid mixture increased OCR also when supplemented alone (FIG.

results suggested that both eNOS and mTORC1 may play a role in the effects of DOX and α5 treatment.

Emphasizing this hypothesis, Sestrin2 has been recently proposed as a leucine sensor for the mTORC1 pathway, since high Sestrin2 levels inhibit mTORC1 activity when intracellular leucine concentrations are low. Conversely, either low Sestrin2 levels or high intracellular leucine concentrations—displacing Sestrin2 from the mTORC1 inhibitor GATOR2—promote mTORC1 activation. Given that the α5 composition contains high leucine quantity, Sestrin2 expression was measured. DOX treatment markedly increased Sestrin2 mRNA in the left ventricle (FIG. 8E). Notably, α5 fully prevented this DOX-induced effect, although unable to change Sestrin2 expression when supplemented alone (FIG. 8E).

Similarly, Krüppel-like factor 15 (KLF15) has recently emerged as a critical transcriptional regulator of amino acid metabolism, particularly BCAA catabolism (i.e., the BCAA oxidation with production of acetyl-CoA and succinyl-CoA, two TCA intermediates), especially in the heart, as well as an inducer of eNOS expression in endothelial cells. Thus, KLF15 expression was analyzed in the left ventricle of the different treatment groups. Klf15 mRNA levels were significantly reduced by DOX treatment, and this reduction was fully prevented by the α5 supplementation (FIG. 8F). No significant changes were observed when α5 was supplemented alone (FIG. 8F). Given the expression or activity of mitochondrial BCAA catabolic enzymes, such as the branched-chain a-keto acid dehydrogenase (BCKDH) complex, in the cardiac tissue is reduced in Klf15-null mice and heart failure, the BCKDH protein transcript was investigated, in addition to the BCKDH phosphorylation in the DOX-treated animals. When phosphorylated in fact BCKDH is inactive, while conversely when dephosphorylated it is active. Notably, the (Ser293)-BCKDH phosphorylation was unchanged in DOX-treated compared to saline-treated mice, while α5 supplementation markedly reduced it in the presence of DOX, with an inhibitory trend effect also when supplemented alone (FIG. 8G). Together, these results suggested that in vivo protection of mitochondrial homeostasis in cardiac tissue by α5 supplementation might be related to a KLF15/eNOS/mTORC1 signaling axis, entailing the BCAA catabolism.

Figure 9:
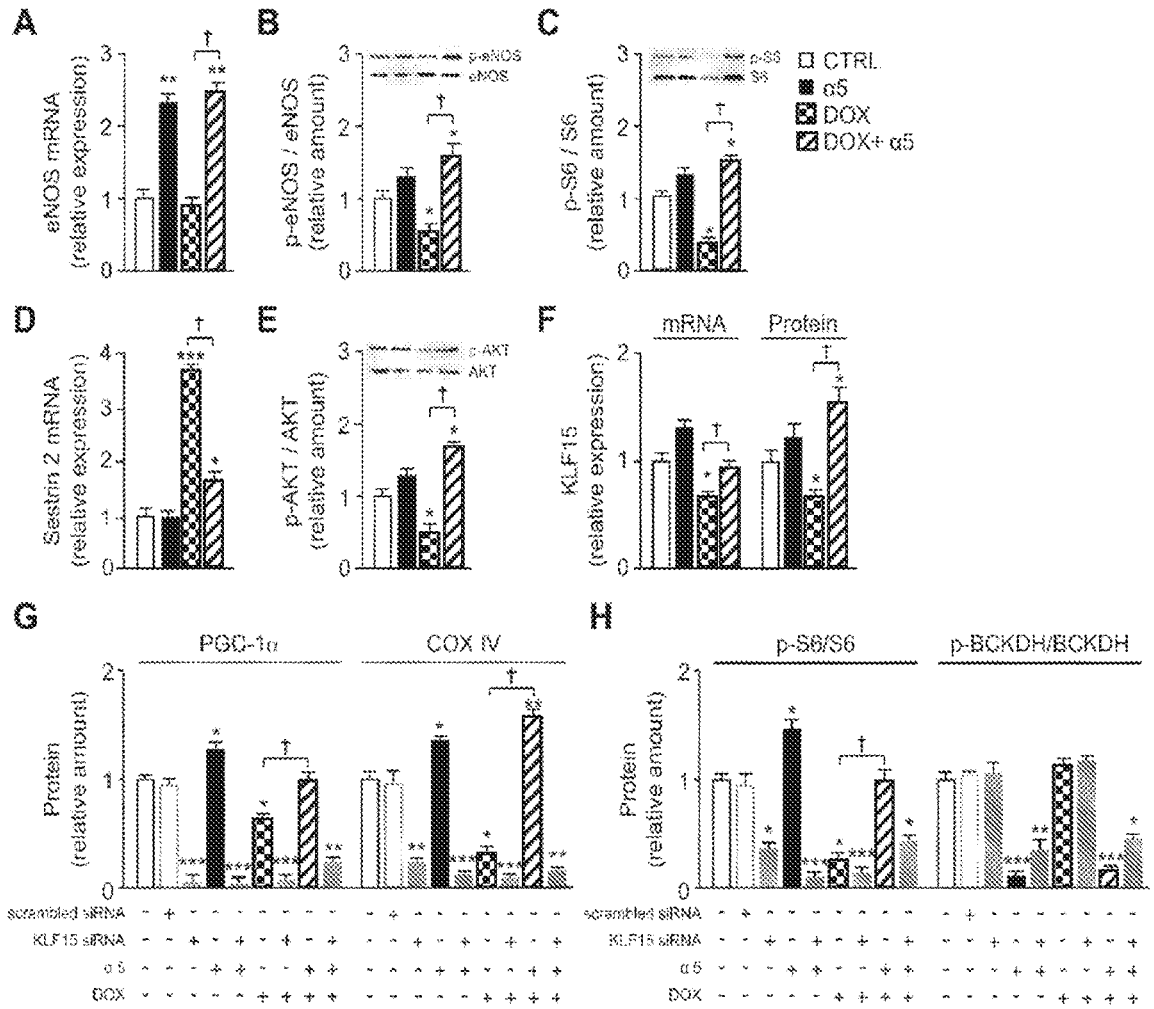
FIG. 9 shows that different signaling pathways are implicated in the protective effects of α5 supplementation in DOX-treated HL-1 cardiomyocytes. (A, D, and F) Gene expression. (A) eNOS, (D) Sestrin2, (F) KLF15 mRNA levels were analysed by quantitative RT-PCR. Relative expression values for the untreated (CTRL) cells were taken as 1.0 (n=5 experiments). (B, C, E-H) Protein levels. (B) Phospho-eNOS, (C) phospho-S6, (E) phospho-Akt, (F) KLF15, (G) PGC-1α and COXIV, and (H) phospho-S6 and phospho-BCKDH protein levels were detected by immunoblot analysis. The relative values were densitometrically analyzed and reported as ratios to total eNOS, S6, Akt, and BCKDH levels, respectively; KLF15, PGC-1α, and COXIV were normalized to GAPDH. Values for untreated HL-1 cells were taken as 1.0 (n=5 experiments). (G) PGC1-α and COX IV protein levels were measured by immunoblot analysis in HL-1 cells transfected with either specific KLF15 siRNA or nontargeting siRNA, and treated with DOX or α5 alone or in combination. Values for untreated HL-1 cells were taken as 1.0 (n=5 experiments). (H) S6 and BCKDH phosphorylation was measured by immunoblot analysis in HL-1 cells as in (H). $*p<0.05$, $p<0.01$, and $*p<0.001$ vs. untreated cells; $\dagger p<0.05$ vs. DOX-treated cells. All data are presented as the mean±SD.

The impact of KLF15, eNOS, and mTORC1 on mitochondrial homeostasis in HL-1 cells exposed to DOX and α5 was also assessed. First, although eNOS gene expression was only slightly decreased by 1 µM DOX exposure, (Ser1177)-eNOS phosphorylation was markedly reduced (FIG. 9, A and B). α5 (1% w/v) fully antagonized both DOX inhibitory effects, massively upregulating eNOS expression also when supplemented alone (FIG. 9, A and B). Second, the (Ser235/236)-S6 phosphorylation was markedly decreased by DOX, and this reduction was fully antagonized by α5 (FIG. 9C). Conversely, the amino-acid mixture was ineffective when added alone. In accordance to its role as mTORC1 controller, Sestrin2 expression was markedly increased by DOX, and this increase was fully antagonized by the α5 supplementation (FIG. 9D). The amino-acid composition was ineffective when added alone. Third, based on the modulatory role of Akt, also known as protein kinase B (PKB), on both eNOS and mTORC1 activation, also the (Ser 473)-Akt phosphorylation in HL-1 cells treated with DOX and α5 was studied. DOX markedly reduced Akt phosphorylation, while α5 prevented this effect (FIG. 5E). Since the Akt/PKB signaling pathway was recently found to mediate the effect of BCAAs on the KLF15 expression, the role of this transcription regulator in the protective impact of α5 supplement on the DOX-mediated mitochondrial damage was investigated. Notably, the KLF15 expression was reduced both at mRNA and protein levels when HL-1 cells were exposed to DOX, and α5 fully antagonized this effect (FIG. 9F). Only a slight, not statistically significant increase of KLF15 expression was seen in HL-1 cardiomyocytes exposed to α5 alone (FIG. 9F).

Figure 10:
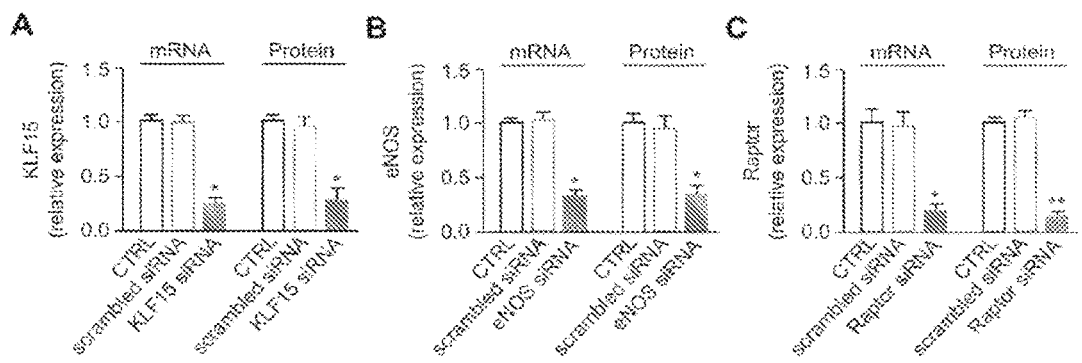
FIG. 10 shows specific Klf15, eNOS, and Raptor silencing in HL-1 cardiomyocytes. (A-C) Klf15, eNOS, and Raptor mRNA levels were analyzed by quantitative RT-PCR and KLF15, eNOS, and Raptor protein levels were detected by immunoblot analysis. Relative expression values for the untreated (CTRL) cells were taken as 1.0 (n=5 experiments). $*p<0.05$ vs. untreated cells. All data are presented as the mean±SD.
Figure 11:
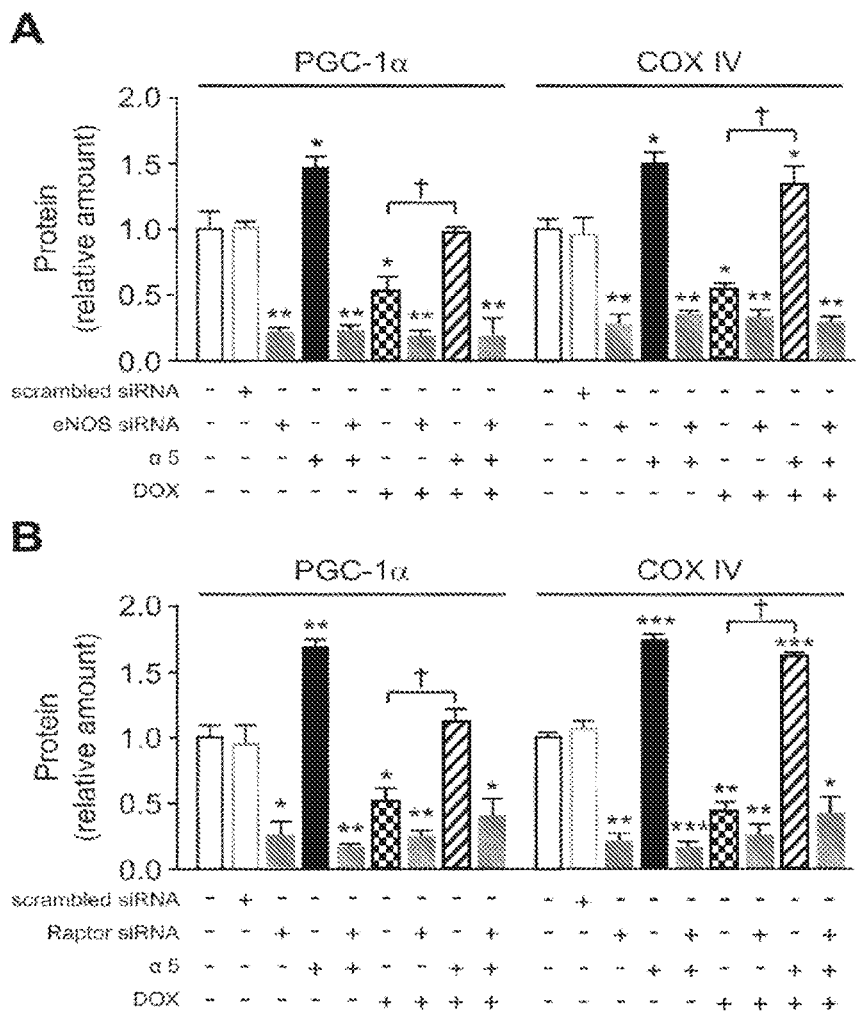
FIG. 11 shows specific eNOS and Raptor silencing in HL-1 cardiomyocytes. (A) PGC1-α and COX IV protein levels were measured by immunoblot analysis in HL-1 cells transfected with either specific eNOS siRNA or nontargeting siRNA, and treated with DOX or α5 alone or in combination. (B) PGC1-α and COX IV protein levels were measured by immunoblot analysis in HL-1 cells transfected with either specific Raptor siRNA or nontargeting siRNA, and treated with DOX or α5 alone or in combination. Values for the untreated (CTRL) cells were taken as 1.0 (n=3 experiments).

The HL-1 cells were then transfected with either specific Klf15 siRNA or nontargeting siRNA. The silencing efficacy was measured both at mRNA and protein levels (FIG. 10). DOX exposure significantly decreased both PGC-1α and COX IV protein in Klf15 siRNA-transfected or otherwise untreated cells (FIG. 9G). Conversely, the Klf15 knockdown markedly reduced PGC1-α and COX IV levels per se and abolished the ability of α5 supplementation to rescue the protein levels when administered with DOX (FIG. 9G). Moreover, the Klf15 knockdown markedly reduced the ability of α5 to promote PGC1-α and COX IV expression when α5 was added alone (FIG. 9G). Noteworthy, the Klf15 knockdown massively impaired the ability of α5 to restore the DOX-reduced (Ser235/236)-S6 phosphorylation (FIG. 9H). Finally, while (Ser293)-BCKDH phosphorylation was not different between DOX-treated and untreated control HL-1 cardiomyocytes, p-BCKDH fully disappeared when the cells were exposed to α5, with or without DOX (FIG. 9H). Klf15 knockdown partially prevented the inhibitory effect of α5 on (Ser293)-BCKDH phosphorylation both in DOX-treated and untreated cells, while DOX was unable to change phosphorylation when added alone (FIG. 9H). Similarly, silencing of eNOS and Raptor—one of the scaffold proteins of mTORC1 (regulatory-associated protein of mTOR)—with specific siRNAs reduced PGC1-α and COX IV levels per se and abolished the ability of α5 supplementation to rescue the reduced protein levels when administered with DOX (FIG. 11, A and B). Both eNOS and Raptor knockdown did not change PGC1-α and COX IV expression when α5 was added alone (FIG. 11, A and B). The efficacy of specific silencing was evaluated by RT-PCR and Western blot; nearly 70% and 60% down-regulation of eNOS and mTORC1 were obtained with eNOS and Raptor siRNA, respectively (FIG. 10, B and C). Overall, these findings suggest that the protective effects of α5 mixture on DOX-mediated mitochondrial dysfunction in cardiomyocytes could be related to a KLF15/eNOS/mTORC1 signaling axis and BCAA catabolism.

The Anti Proliferative Effect of DOX Remained Unchanged in the MCF7 Breast Cancer Cells in the Presence of the α5 Composition The exposure of MCF7 breast cancer cell line to the α5 composition did not promote MCF7 cell proliferation, as assessed with two different assays (FIGS. 13A and 13B). Similarly, the anti-proliferative effect of DOX in MCF7 cells was completely unaffected by the amino acid presence (FIGS. 13A and 13B). Very interestingly, the effect of DOX is potentiated when administered together with the α5 composition.

As disclosed in the section above, although the anthracycline DOX (trade name Adriamycin) is a highly effective and frequently used antineoplastic drug since its introduction in the 1960s, it causes a dose-related cardiotoxicity that can lead to severe heart failure. If the heart has been damaged by DOX, treatment options are few. Typically, DOX-induced cardiomyopathy and heart failure are refractory to conventional therapy [1]. Increasing efforts to predict which patients will be affected by DOX cardiotoxicity—including analysis of the patient-specific human induced pluripotent stem cell-derived cardiomyocytes—and to appropriately prevent this risk, encompassing drugs, such as iron-chelating agents, angiotensin-converting enzyme inhibitors, β-blockers, antioxidants, and natural products or food supplements, have been proposed inconclusively. Here, the efficacy of the α5 composition and of the BCAAem composition in preventing the DOX-induced mitochondrial damage in cultured HL-1 cardiomyocytes has been tested. α5 was statistically more efficient than BCAAem to counteract the DOX-induced deficit of mitochondrial biogenesis markers. Dietary supplementation of α5 activates a KLF15/Akt/eNOS/mTORC1 signalling axis (FIG. 12). These results also do not exclude a role of mTORC2, a signalling pathway that seems to be essential for normal cardiac development and for the maintenance of postnatal cardiac structure and function, especially to adapt to stress conditions. However, mTORC2 has not been until now implied, in the DOX cardiotoxicity. Moreover, the present findings on KLF15 and Sestrin2 similarly cast doubt on the relevance of mTORC2 signaling in this experimental model. One of the most relevant findings shown in the present application is the massive downregulation of PGC-1α and COX-IV protein—that are mitochondrial biogenesis markers—induced by the KLF15 silencing in HL-1 cardiomyocytes. The Kruppel-like factors (KLF) family of Cys2/His2 zinc-finger transcriptional regulators control many aspects of cardiomyocyte and mitochondrial structure and function. Importantly, KLF15 regulates Wnt/β-catenin transcription and controls cardiac progenitor cell fate in the postnatal heart, suggesting a role in cardiac development.

The present application shows that the Klf15-, eNOS-, and Raptor-silenced cardiomyocytes were unresponsive to the α5, which was unable to promote mitochondrial biogenesis per se and to protect the mitochondrial damage when supplemented with DOX. Moreover, after a 72-h treatment with DOX the Klf15 gene expression was reduced in cardiac tissue.

The α5 supplementation prevents mitochondrial dysfunction induced by acute DOX by promoting 1) mitochondrial biogenesis, 2) anti-ROS defense system, and 3) BCAA oxidation, with a probable production of TCA intermediates, apparently in an mTORC1-dependent manner (FIG. 12).

The Klf15-knockdown in fact markedly reduced the mTORC1 activity in HL-1 cells and impaired the ability of α5 mixture to restore the DOX-compromised S6 phosphorylation. Similarly, the Klf15 silencing partially prevented the α5-induced activation of BCAA catabolism—measured as BCKDH phosphorylation—both in DOX-treated and untreated cardiomyocytes. This suggests that in cardiac cells the protective effect of α5 is mediated, at least in part, by the mTORC1 activation, that depends on the KLF15 expression and, thus, on the BCAA oxidation. Moreover, in cardiac cells and tissue α5 restored to control levels Sestrin2, which is highly expressed after DOX treatment. Sestrins are a family of stress-inducible proteins (Sestrin1-3) and a variety of evidence indicates that Sestrin2 is a leucine sensor for the mTORC1 pathway. Normally bound to GATOR2, which is thus inhibited under unstressed conditions, Sestrin2 is displaced from GATOR2 when leucine is present at micromolar intracellular concentrations, activating mTORC1. α5 composition promoted the eNOS expression and activity, in both DOX-treated and untreated cardiac cells and tissue. Probably these effects were mediated by (Ser473)-Akt phosphorylation.

Interestingly, although the role of amino acid-based compositions in the nutritional support of cancer patients has been, up to now, to be clearly defined, the instant application shows that the exposure of MCF7 breast cancer cell line to the α5 composition did not promote MCF7 cell proliferation, as assessed with two different assays (FIGS. 13A and 13B). Similarly, the anti-proliferative effect of DOX in MCF7 cells was completely unaffected by the amino acid presence (FIGS. 13A and 13B). Very interestingly, the rate of proliferation is reduced when the α5 composition is administered.

Overall the results herein reported have shown: 1) that acute DOX treatment induces mitochondrial dysfunction in both cardiac tissue and cardiomyocytes, 2) that the α5 composition markedly prevents this damage, 3) eNOS and mTORC1 signaling pathways are crucially involved in the action of this protector, 4) that KLF15, a specific transcription factor particularly important in cardiac development and circadian regulation, plays a relevant role in controlling these signaling axis, 5) the anti-proliferative effect of DOX in MCF7 cells was completely unaffected by the amino acid presence.

These findings highlight the efficacy of the α5 composition in the prevention and treatment of cardiotoxicity induced by chemotherapeutic agents, such as for example doxorubicin, in subjects undergoing chemotherapy.

REFERENCES

1. Singal, P. K.; Iliskovic, N. Doxorubicin-induced cardiomyopathy. N. Engl. J. Med. 1998, 339, 900-5.
2. Claycomb, W. C.; Lanson, N. A.; Stallworth, B. S.; Egeland, D. B.; Delcarpio, J. B.; Bahinski, A.; Izzo, N. J. HL-1 cells: a cardiac muscle cell line that contracts and retains phenotypic characteristics of the adult cardiomyocyte. Proc. Natl. Acad. Sci. U.S.A 1998, 95, 2979-84.
3. Vettor, R.; Valerio, A.; Ragni, M.; Trevellin, E.; Granzotto, M.; Olivieri, M.; Tedesco, L.; Ruocco, C.; Fossati, A.; Fabris, R.; et al. Exercise training boosts eNOS-dependent mitochondrial biogenesis in mouse heart: role in adaptation of glucose metabolism. Am. J. Physiol. Endocrinol. Metab. 2014, 306, E519-28.
4. Gao, J.; Chen, T.; Zhao, D.; Zheng, J.; Liu, Z. Ginkgolide B Exerts Cardioprotective Properties against Doxorubicin-Induced Cardiotoxicity by Regulating Reactive Oxygen Species, Akt and Calcium Signaling Pathways In Vitro and In Vivo. PLoS One 2016, 11, e0168219.
5. Palanivel, R.; Eguchi, M.; Shuralyova, I.; Coe, I.; Sweeney, G. Distinct effects of short- and long-term leptin treatment on glucose and fatty acid uptake and metabolism in HL-1 cardiomyocytes. Metabolism. 2006, 55, 1067-75.
6. Abdullah, C. S.; Alam, S.; Aishwarya, R.; Miriyala, S.; Bhuiyan, M. A. N.; Panchatcharam, M.; Pattillo, C. B.; Orr, A. W.; Sadoshima, J.; Hill, J. A.; et al. Doxorubicin-induced cardiomyopathy associated with inhibition of autophagic degradation process and defects in mitochondrial respiration. Sci. Rep. 2019, 9, 2002.
7. Tedesco, L.; Valerio, A.; Cervino, C.; Cardile, A.; Pagano, C.; Vettor, R.; Pasquali, R.; Carruba, M. O.; Marsicano, G.; Lutz, B.; et al. Cannabinoid type 1 receptor blockade promotes mitochondrial biogenesis through endothelial nitric oxide synthase expression in white adipocytes. Diabetes 2008, 57, 2028-36.
8. Frontini, A.; Bertolotti, P.; Tonello, C.; Valerio, A.; Nisoli, E.; Cinti, S.; Giordano, A. Leptin-dependent STAT3 phosphorylation in postnatal mouse hypothalamus. Brain Res. 2008, 1215, 105-115
9. D'Antona, G.; Ragni, M.; Cardile, A.; Tedesco, L.; Dossena, M.; Bruttini, F.; Caliaro, F.; Corsetti, G.; Bottinelli, R.; Carruba, M. O.; et al. Branched-Chain Amino Acid Supplementation Promotes Survival and Supports Cardiac and Skeletal Muscle Mitochondrial Biogenesis in Middle-Aged Mice. Cell Metab. 2010, 12, 362-372.
10. Flamment, M.; Gueguen, N.; Wetterwald, C.; Simard, G.; Malthiery, Y.; Ducluzeau, P.-H. Effects of the cannabinoid CB1 antagonist rimonabant on hepatic mitochondrial function in rats fed a high-fat diet. Am. J. Physiol. Endocrinol. Metab. 2009, 297, E1162-70.
11. Sparks, L. M.; Xie, H.; Koza, R. A.; Mynatt, R.; Hulver, M. W.; Bray, G. A.; Smith, S. R. A high-fat diet coordinately downregulates genes required for mitochondrial oxidative phosphorylation in skeletal muscle. Diabetes 2005, 54,
12. López-Lluch, G.; Hunt, N.; Jones, B.; Zhu, M.; Jamieson, H.; Hilmer, S.; Cascajo, M. V.; Allard, J.; Ingram, D. K.; Navas, P.; et al. Calorie restriction induces mitochondrial biogenesis and bioenergetic efficiency. Proc. Natl. Acad. Sci. 2006, 103, 1768-1773.

13. Tedesco, L.; Corsetti, G.; Ruocco, C.; Ragni, M.; Rossi, F.; Carruba, M. O.; Valerio, A.; Nisoli, E. A specific amino acid formula prevents alcoholic liver disease in rodents. Am. J. Physiol. Gastrointest. Liver Physiol. 2018, 314, G566—G582
14. Nisoli, E. Mitochondrial Biogenesis in Mammals: The Role of Endogenous Nitric Oxide. Science (80-.). 2003, 299, 896-899.
15. Valerio, A.; Cardile, A.; Cozzi, V.; Bracale, R.; Tedesco, L.; Pisconti, A.; Palomba, L.; Cantoni, O.; Clementi, E.; Moncada, S.; et al. TNF-alpha downregulates eNOS expression and mitochondrial biogenesis in fat and muscle of obese rodents. J. Clin. Invest. 2006, 116, 2791-8.
16. Lionetti, L.; Mollica, M. P.; Crescenzo, R.; D'Andrea, E.; Ferraro, M.; Bianco, F.; Liverini, G.; Iossa, S. Skeletal muscle subsarcolemmal mitochondrial dysfunction in high-fat fed rats exhibiting impaired glucose homeostasis. Int. J. Obes. 2007, 31, 1596-1604.
17. Pervin, S.; Singh, R.; Hernandez, E.; Wu, G.; Chaudhuri, G. Nitric oxide in physiologic concentrations targets the translational machinery to increase the proliferation of human breast cancer cells: involvement of mammalian target of rapamycin/eIF4E pathway. Cancer Res. 2007, 67, 289-99.

The invention claimed is:

1. A method of treating cardiotoxicity induced by at least one chemotherapeutic agent in a subject undergoing chemotherapy, the method comprising administering to the subject a therapeutically effective amount of an active agent, said active agent containing the amino acids leucine, isoleucine, valine, threonine, lysine and citric acid, succinic acid, malic acid wherein said chemotherapeutic agent is doxorubicin.

2. The method according to claim 1, wherein the weight ratio between the sum of citric acid, malic acid, succinic acid and the sum of the branched chain amino acids leucine, isoleucine, valine plus lysine and threonine is comprised between 0.05 and 0.3.

3. The method according to claim 1, wherein the weight ratio between the overall amount of citric acid, malic acid, succinic acid and the overall amount of the branched chain amino acids leucine, isoleucine, valine is comprised between 0.1 and 0.4.

4. The method according to claim 1, wherein the weight ratio between citric acid and the sum of malic acid and succinic acid is comprised between 1.0 and 4.0, preferably between 1.5 and 2.5.

5. The method according to claim 1, wherein the citric acid:malic acid:succinic acid weight ratio is comprised between 10:1:1 and 2:1.5:1.5.

6. The method according to claim 1, wherein said active agent further comprises at least one amino acid selected from the group consisting of histidine, phenylalanine, methionine, tryptophan, tyrosine, cysteine.

7. The method according to claim 1, wherein said active agent further comprises histidine, phenylalanine, methionine, tryptophan, and cysteine.

8. The method according to claim 1, wherein the ratio between the overall molar amount of citric acid, malic acid, succinic acid and the overall molar amount of methionine, phenylalanine, histidine and tryptophan is higher than 1.35.

9. The method according to claim 1, wherein the ratio between the overall molar amount of the three acids citric acid, succinic acid, malic acid and the overall molar amount of lysine and threonine is comprised between 0.10 and 0.70.

10. The method according to claim 1, wherein the weight or molar amount of citric acid is higher than the overall weight or molar amount of both malic acid and succinic acid.

11. The method according to claim 1, wherein the weight ratio between leucine and citric acid is comprised between 5 and 1.

12. The method according to claim 1, wherein said composition is free of arginine.

13. The method according to claim 1, wherein said composition is free of serine, proline, alanine.

14. A method of treating cardiotoxicity in a subject affected by cancer comprising administering
  a) a therapeutically effective amount of an active agent, said active agent containing the amino acids leucine, isoleucine, valine, threonine, lysine and citric acid, succinic acid, malic acid, and
  b) a therapeutically effective amount of at least one chemotherapeutic agent, wherein the active agent and at least one chemotherapeutic agent are administered simultaneously, separately or sequentially wherein said chemotherapeutic agent is doxorubicin.

15. The method according to claim 5, wherein the citric acid:malic acid:succinic acid weight ratio is comprised between 7:1:1 and 1.5:1:1.

16. The method according to claim 5, wherein the citric acid:malic acid:succinic acid weight ratio is comprised between 5:1:1 and 3:1:1.

17. The method according to claim 7, wherein said active agent further comprises histidine, phenylalanine, methionine, tryptophan, cysteine and tyrosine.

18. The method according to claim 11, wherein the weight ratio between leucine and citric acid is comprised between 2.50 and 3.50.

* * * * *

SEQUENCE LISTING

```
<160> NUMBER OF SEQ ID NOS: 30

<210> SEQ ID NO 1
<211> LENGTH: 23
<212> TYPE: DNA
<213> ORGANISM: Artificial Sequence
<220> FEATURE:
<223> OTHER INFORMATION: Cat Primer Sense 5'-3'

<400> SEQUENCE: 1
cactgacgag atggcacact ttg                                              23

<210> SEQ ID NO 2
<211> LENGTH: 22
<212> TYPE: DNA
<213> ORGANISM: Artificial Sequence
<220> FEATURE:
<223> OTHER INFORMATION: Cat Primer Antisense 5'-3'

<400> SEQUENCE: 2
tggagaaccg aacggcaata gg                                               22

<210> SEQ ID NO 3
<211> LENGTH: 24
<212> TYPE: DNA
<213> ORGANISM: Artificial Sequence
<220> FEATURE:
<223> OTHER INFORMATION: COX IV Primer Sense 5'-3'

<400> SEQUENCE: 3
tgggactatg acaagaatga gtgg                                             24

<210> SEQ ID NO 4
<211> LENGTH: 23
<212> TYPE: DNA
<213> ORGANISM: Artificial Sequence
<220> FEATURE:
<223> OTHER INFORMATION: COX IV Primer Antisense 5'-3'

<400> SEQUENCE: 4
ttagcatgga ccattggata cgg                                              23

<210> SEQ ID NO 5
<211> LENGTH: 22
<212> TYPE: DNA
<213> ORGANISM: Artificial Sequence
<220> FEATURE:
<223> OTHER INFORMATION: Cyt c Primer Sense 5'-3'

<400> SEQUENCE: 5 atagggcat gtcacctcaa ac                                                22
```

<210> SEQ ID NO 6
<211> LENGTH: 22
<212> TYPE: DNA
<213> ORGANISM: Artificial Sequence
<220> FEATURE:
<223> OTHER INFORMATION: Primer Antisense 5'-3'

<400> SEQUENCE: 6
gtggttagcc atgacctgaa ag                                          22

<210> SEQ ID NO 7
<211> LENGTH: 20
<212> TYPE: DNA
<213> ORGANISM: Artificial Sequence
<220> FEATURE:
<223> OTHER INFORMATION: eNOS Primer Sense 5'-3'

<400> SEQUENCE: 7
agcggctggt acatgagttc                                             20

<210> SEQ ID NO 8
<211> LENGTH: 21
<212> TYPE: DNA
<213> ORGANISM: Artificial Sequence
<220> FEATURE:
<223> OTHER INFORMATION: eNOS Primer Antisense 5'-3'

<400> SEQUENCE: 8
gatgaggttg tcctggtgtc c                                           21

<210> SEQ ID NO 9
<211> LENGTH: 19
<212> TYPE: DNA
<213> ORGANISM: Artificial Sequence
<220> FEATURE:
<223> OTHER INFORMATION: GPX1 Primer Sense 5'-3'

<400> SEQUENCE: 9
tctgggacct cgtggactg                                              19

<210> SEQ ID NO 10
<211> LENGTH: 23
<212> TYPE: DNA
<213> ORGANISM: Artificial Sequence
<220> FEATURE:
<223> OTHER INFORMATION: GPX1 Primer Antisense 5'-3'

<400> SEQUENCE: 10
cacttcgcac ttctcaaaca atg                                         23

<210> SEQ ID NO 11
<211> LENGTH: 20
<212> TYPE: DNA
<213> ORGANISM: Artificial Sequence
<220> FEATURE:
<223> OTHER INFORMATION: KLF15 Primer Sense 5'-3'

<400> SEQUENCE: 11
acaccaagag cagccacctc                                             20

<210> SEQ ID NO 12
<211> LENGTH: 20
<212> TYPE: DNA
<213> ORGANISM: Artificial Sequence
<220> FEATURE:

<223> OTHER INFORMATION: KLF15 Primer Antisense 5'-3'

<400> SEQUENCE: 12
tgagatcgcc ggtgccttga                                               20

<210> SEQ ID NO 13
<211> LENGTH: 20
<212> TYPE: DNA
<213> ORGANISM: Artificial Sequence
<220> FEATURE:
<223> OTHER INFORMATION: mtDNA Primer sense 5'-3'

<400> SEQUENCE: 13
ccacttcatc ttaccattta                                               20

<210> SEQ ID NO 14
<211> LENGTH: 20
<212> TYPE: DNA
<213> ORGANISM: Artificial Sequence
<220> FEATURE:
<223> OTHER INFORMATION: mtDNA Primer Antisense 5'-3'

<400> SEQUENCE: 14
atctgcatct gagtttaatc                                               20

<210> SEQ ID NO 15
<211> LENGTH: 23
<212> TYPE: DNA
<213> ORGANISM: Artificial Sequence
<220> FEATURE:
<223> OTHER INFORMATION: NRF1 Primer Sense 5'-3'

<400> SEQUENCE: 15
acagatagtc ctgtctgggg aaa                                           23

<210> SEQ ID NO 16
<211> LENGTH: 22
<212> TYPE: DNA
<213> ORGANISM: Artificial Sequence
<220> FEATURE:
<223> OTHER INFORMATION: NRF1 Primer Antisense 5'-3'

<400> SEQUENCE: 16
tggtacatgc tcacagggat ct                                            22

<210> SEQ ID NO 17
<211> LENGTH: 24
<212> TYPE: DNA
<213> ORGANISM: Artificial Sequence
<220> FEATURE:
<223> OTHER INFORMATION: PGC-1a Primer Sense 5'-3'

<400> SEQUENCE: 17
actatgaatc aagccactac agac                                          24

<210> SEQ ID NO 18
<211> LENGTH: 22
<212> TYPE: DNA
<213> ORGANISM: Artificial Sequence
<220> FEATURE:
<223> OTHER INFORMATION: PGC-1a Primer Antisense 5'-3'

<400> SEQUENCE: 18
ttcatccctc ttgagccttt cg                                            22

```
<210> SEQ ID NO 19
<211> LENGTH: 20
<212> TYPE: DNA
<213> ORGANISM: Artificial Sequence
<220> FEATURE:
<223> OTHER INFORMATION: SESN2 Primer Sense 5'-3'

<400> SEQUENCE: 19
gcccctgaga agctccgcaa                                               20

<210> SEQ ID NO 20
<211> LENGTH: 20
<212> TYPE: DNA
<213> ORGANISM: Artificial Sequence
<220> FEATURE:
<223> OTHER INFORMATION: SESN2 Primer Antisense 5'-3'

<400> SEQUENCE: 20
gagttcggcc agggaccagc                                               20

<210> SEQ ID NO 21
<211> LENGTH: 19
<212> TYPE: DNA
<213> ORGANISM: Artificial Sequence
<220> FEATURE:
<223> OTHER INFORMATION: SOD1 Primer Sense 5'-3'

<400> SEQUENCE: 21
ggcttctcgt cttgctctc                                                19

<210> SEQ ID NO 22
<211> LENGTH: 18
<212> TYPE: DNA
<213> ORGANISM: Artificial Sequence
<220> FEATURE:
<223> OTHER INFORMATION: SOD1 Primer Antisense 5'-3'

<400> SEQUENCE: 22
aactggttca ccgcttgc                                                 18

<210> SEQ ID NO 23
<211> LENGTH: 20
<212> TYPE: DNA
<213> ORGANISM: Artificial Sequence
<220> FEATURE:
<223> OTHER INFORMATION: SOD2 Primer Sense 5'-3'

<400> SEQUENCE: 23
gcctcccaga cctgccttac                                               20

<210> SEQ ID NO 24
<211> LENGTH: 22
<212> TYPE: DNA
<213> ORGANISM: Artificial Sequence
<220> FEATURE:
<223> OTHER INFORMATION: SOD2 Primer Antisense 5'-3'

<400> SEQUENCE: 24
gtggtacttc tcctcggtgg cg                                            22

<210> SEQ ID NO 25
<211> LENGTH: 23
<212> TYPE: DNA
<213> ORGANISM: Artificial Sequence
<220> FEATURE:
<223> OTHER INFORMATION: TBP Primer Sense 5'-3'
```

```
<400> SEQUENCE: 25
acccttcacc aatgactcct atg                                              23

<210> SEQ ID NO 26
<211> LENGTH: 21
<212> TYPE: DNA
<213> ORGANISM: Artificial Sequence
<220> FEATURE:
<223> OTHER INFORMATION: TBP Primer Antisense 5'-3'

<400> SEQUENCE: 26
tgactgcagc aaatcgcttg g                                                21

<210> SEQ ID NO 27
<211> LENGTH: 25
<212> TYPE: DNA
<213> ORGANISM: Artificial Sequence
<220> FEATURE:
<223> OTHER INFORMATION: Tfam Primer Sense 5'-3'

<400> SEQUENCE: 27
aagacctcgt tcagcatata acatt                                            25

<210> SEQ ID NO 28
<211> LENGTH: 23
<212> TYPE: DNA
<213> ORGANISM: Artificial Sequence
<220> FEATURE:
<223> OTHER INFORMATION: Tfam Primer Antisense 5'-3'

<400> SEQUENCE: 28
ttttccaagc ctcatttaca agc                                              23

<210> SEQ ID NO 29
<211> LENGTH: 25
<212> TYPE: DNA
<213> ORGANISM: Artificial Sequence
<220> FEATURE:
<223> OTHER INFORMATION: 18S Primer Sense 5'-3'

<400> SEQUENCE: 29
ctgccctatc aactttcgat ggtag                                            25

<210> SEQ ID NO 30
<211> LENGTH: 21
<212> TYPE: DNA
<213> ORGANISM: Artificial Sequence
<220> FEATURE:
<223> OTHER INFORMATION: 18S Primer Antisense 5'-3'

<400> SEQUENCE: 30
ccgtttctca ggctccctct c                                                21
```